(12) United States Patent
Hossain et al.

(10) Patent No.: US 12,515,203 B1
(45) Date of Patent: Jan. 6, 2026

(54) OXYGEN CARRIER COMPOSITIONS

(71) Applicant: King Fahd University of Petroleum and Minerals, Dhahran (SA)

(72) Inventors: Mohammad M. Hossain, Dhahran (SA); Achmad Putra, Dhahran (SA); Shaikh Abdur Razzak, Dhahran (SA); Dwi Hantoko, Dhahran (SA); Wasim Ullah Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/239,490

(22) Filed: Jun. 16, 2025

(51) Int. Cl.
| | | |
|---|---|---|
| *B01J 23/83* | (2006.01) | |
| *B01J 21/04* | (2006.01) | |
| *B01J 35/31* | (2024.01) | |
| *B01J 35/63* | (2024.01) | |
| *B01J 35/64* | (2024.01) | |
| *B01J 35/77* | (2024.01) | |
| *B01J 37/02* | (2006.01) | |
| *B01J 37/08* | (2006.01) | |
| *B01J 37/12* | (2006.01) | |
| *C01B 3/26* | (2006.01) | |

(52) U.S. Cl.
CPC .............. *B01J 23/83* (2013.01); *B01J 21/04* (2013.01); *B01J 35/31* (2024.01); *B01J 35/633* (2024.01); *B01J 35/647* (2024.01); *B01J 35/77* (2024.01); *B01J 37/0215* (2013.01); *B01J 37/08* (2013.01); *B01J 37/12* (2013.01); *C01B 3/26* (2013.01); *B01J 2235/15* (2024.01); *B01J 2235/30* (2024.01); *C01B 2203/0277* (2013.01); *C01B 2203/1047* (2013.01)

(58) Field of Classification Search
CPC ........ B01J 37/0215; B01J 37/08; B01J 37/12; B01J 21/04; B01J 35/647; B01J 35/31; B01J 35/633; B01J 35/77; C01B 3/26
See application file for complete search history.

(56) References Cited

U.S. PATENT DOCUMENTS

| | | | |
|---|---|---|---|
| 2013/0302241 | A1 | 11/2013 | Pieterse |
| 2022/0288568 | A1 | 9/2022 | Fan et al. |

FOREIGN PATENT DOCUMENTS

| | | |
|---|---|---|
| CN | 103387865 A | 11/2013 |
| CN | 103551156 A | 2/2014 |
| CN | 117585642 A | 2/2024 |

OTHER PUBLICATIONS

Hafizi et al., Applied Energy, (2016), v. 165, p. 685-694.*
Kang et al., Ind. Eng. Chem. Res., (2020), v.59, 15912-15920.*
Dohyung Kang, et al., "Mesoporous Fe2O3—CeO2—Al2O3 Oxygen Carrier for Chemical Looping Dry Reforming with Subsequent Water Splitting", Industrial & Engineering Chemistry Research, vol. 59, Issue 36, Aug. 12, 2020, pp. 15912-15920, Abstract Only, 2 pages.
Shangzhe Sun, et al., "Performance of CeO2-Modified Iron-Based Oxygen Carrier in the Chemical Looping Hydrogen Generation Process", Energy Fuels 2015, vol. 29, Issue 11, Oct. 8, 2015, pp. 7612-7621, Abstract only, 2 pages.
Kongzhai Li, et al., "Syngas production from methane and air via a redox process using Ce—Fe mixed oxides as oxygen carriers", Applied Catalysis B: Environmental, vol. 97, Issues 3-4, Jun. 18, 2010, pp. 361-372, Excerpts only, 4 pages.
Achmad Ferdiansyah Pradana Putra et al., "Activity of Fa2O3/CeO2—Al2O3 catalysts/oxygen carriers in a fluidized bed chemical looping process for blue hydrogen production", Catalysis Today 456 (2025) 15 pages.

* cited by examiner

*Primary Examiner* — Yong L Chu
(74) *Attorney, Agent, or Firm* — Oblon, McClelland, Maier & Neustadt, L.L.P.

(57) ABSTRACT

An oxygen carrier includes an alumina support, cerium oxide in an amount of 0.5 to 2 percent by weight (wt. %), and iron oxide in an amount of 5 to 35 wt. %, where the percent by weight is based on a total weight of the oxygen carrier. Further, the cerium oxide and the iron oxide are doped on the alumina support, the oxygen carrier is in the form of layered particles having a longest dimension of 50 to 500 nm. Furthermore, the oxygen carrier is porous with an average pore volume of 0.01 to 0.05 cm$^3$/g and an average pore diameter of 10 to 20 nm, the iron oxide has an average crystallite size of 10 to 30 nm, and the oxygen carrier includes a $CeO_2$ phase, an $Al_2O_3$ phase, an $Fe_2O_3$ phase, and an $FeAl_2O_4$ phase.

17 Claims, 20 Drawing Sheets

OXYGEN CARRIER COMPOSITIONS

CROSS-REFERENCE TO RELATED APPLICATION

The present disclosure claims the benefit of Saudi Patent Application No. 1020254086 filed on Jun. 5, 2025 with the Saudi Authority for Intellectual Property Office, which is incorporated herein by reference in its entirety.

STATEMENT OF ACKNOWLEDGEMENT

Support provided by the Interdisciplinary Research Center for Refining and Advanced Chemicals, King Fahd University of Petroleum and Minerals, Saudi Arabia, through Project INRC2402 is gratefully acknowledged.

BACKGROUND

Technical Field

The present disclosure relates to chemical looping technologies for hydrogen production, and more particularly, pertains to oxygen carrier compositions including iron oxide and cerium oxide doped on alumina supports, and to a method for converting methane into hydrogen and carbon oxides.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

The global objective of achieving net zero greenhouse gas emissions by the year 2050, as outlined under the Paris Agreement, presents a challenge for energy-producing systems. A parallel demand exists to increase the share of environmentally friendly energy sources across industrial and energy sectors. Hydrogen-based energy has emerged as a candidate in satisfying both decarbonization goals and sustainable energy transitions. Hydrogen production technologies are classified according to their associated carbon emissions. Gray hydrogen technologies, which include steam methane reforming, partial oxidation of methane, autothermal reforming, and coal gasification, are characterized by high carbon dioxide ($CO_2$) emissions. Blue hydrogen technologies aim to reduce emissions by integrating carbon capture, utilization, and storage (CCUS) with gray hydrogen production processes [AlHumaidan, F. S. et al., Blue hydrogen: Current status and future technologies, *Energy Convers Manag*, 2023, 283, 116840]. Turquoise hydrogen, produced via methane pyrolysis, eliminates $CO_2$ generation but remains under development. Green hydrogen, the ultimate objective, utilizes renewable energy for $CO_2$-free hydrogen generation through water electrolysis.

Although green hydrogen offers a long-term solution, current infrastructure and cost constraints hinder immediate deployment of green hydrogen. The transition from gray to green hydrogen necessitates a bridging technology to provide a near-term, scalable solution. Blue hydrogen has been identified as a technological bridge to support the net zero roadmap, and research is underway to improve efficiency and cost-effectiveness of blue hydrogen [Yu, M. et al., Insights into low-carbon hydrogen production methods: Green, blue and aqua hydrogen, *Int J Hydrogen Energy*, 2021, 46, 41, 21261-21273; and Lee, H. et al., Hydrogen production from fishing net waste for sustainable clean fuel: Techno-economic analysis and life cycle assessment, *Chemical Engineering Journal*, 2024, 481, 148741]. The most widely adopted approach for blue hydrogen production is steam methane reforming combined with CCUS. While steam reforming is technologically mature, it requires multiple downstream separation and purification steps, including the water-gas shift reaction and carbon dioxide removal, to meet hydrogen purity standards [Di Nardo, A. et al., Hydrogen production via steam reforming of different fuels: thermodynamic comparison, *Int J Hydrogen Energy*, 2023]. Additional steps increase system complexity, energy consumption, and capital costs. Chemical looping has emerged as an alternative pathway to reduce costs and complexity associated with blue hydrogen production.

Chemical looping processes enables in-situ $CO_2$ separation without the need for a dedicated separation unit. Process architecture allows for modular decomposition of overall reactions into sub-reactions, leveraging cyclic redox transformations of an oxygen carrier in three interconnected reactor stages: an oxidizer, combustor, and reducer [Zeng, L. et al., Metal oxide redox chemistry for chemical looping processes, *Nat Rev Chem*, 2018, 2, 11, 349-364; Zhou, Z. et al., Model-assisted analysis of fluidized bed chemical-looping reactors, *Chem Eng Sci*, 2015, 134, 619-631; and Bulfin, B. et al., Countercurrent chemical looping for enhanced methane reforming with complete conversion and inherent CO, *Chemical Engineering Journal*, 2024, 488, 150513].

Within the chemical looping architecture, methane reacts with solid-phase lattice oxygen from an oxygen carrier to generate $CO_2$ and $H_2O$. The gaseous products may be readily separated by condensation. The reduced metal component of the oxygen carrier is further transferred to a subsequent reactor and the reduced metal component of oxygen reacts with $H_2O$ to generate hydrogen. Product distribution, redox capacity, and hydrogen yield are influenced by chemical characteristics of the lattice oxygen in the oxygen carrier.

Effective implementation of chemical looping hydrogen production depends on the selection of oxygen carriers capable of sustaining redox performance over multiple high-temperature cycles [De Vos, Y. et al., Development of stable oxygen carrier materials for chemical looping processes—A review, *Catalysts*, 2020, 10, 8, 926]. Iron (Fe) has been identified as an active material due to thermal stability, redox reversibility, cost-effectiveness, and wide availability of iron. In addition to the redox-active phase, support materials play a role in thermal management and structural stabilization of the oxygen carrier [Cheng, Z. et al., New insight into the development of oxygen carrier materials for chemical looping systems, *Engineering*, 2018, 4, 3, 343-351]. A support must possess high thermal conductivity and a high melting point to tolerate repeated redox cycling. Among materials, alumina is selected for high heat capacity and temperature tolerance. Surface modification of alumina with cerium oxide has been explored to improve redox kinetics and lower reduction onset temperatures. An addition of 1 wt. % cerium to $Al_2O_3$ support improved oxygen carrier performance during reduction, reforming, and combustion processes [Adnan, M. A. et al., In-situ reforming and combustion of liquid fuel using MnOx/Ce-γAl2O3 oxygen carrier in a chemical looping combustion process, *Int J Hydrogen Energy*, 2021, 46, 50, 25500-25512; and Adamu, S. et al., Fluidizable Ni/Ce-meso-Al$_2$O$_3$ for gasification of glucose: Effect of catalyst reduction on hydrogen selectivity, *Journal of Industrial and Engineering Chemistry*, 2018, 64, 467-477].

To validate the suitability of such oxygen carriers in operational settings, evaluation in fluidized bed reactors is performed. Fluidized bed reactors provide enhanced gas-solid contact, uniform temperature distribution, and continuous regeneration of the oxygen carrier during operation [Zheng, H. et al., Chemical looping reforming: process fundamentals and oxygen carriers, *Discover Chemical Engineering*, 2022, 2, 1, 5]. The ability to simulate particle transfer across reactor zones in a fluidized configuration offers advantages over fixed bed reactors, which lack dynamic interaction modelling. These benefits result in a more representative evaluation of oxygen carrier materials for practical deployment.

There exists a need for oxygen carriers including iron and cerium oxides supported on alumina that can withstand high-temperature redox cycling, demonstrate improved hydrogen yield through increased phase distribution, and offer stable performance in fluidized bed reactor environments suitable for scalable blue hydrogen production systems. Accordingly, an object of the present disclosure is to provide an oxygen carrier for hydrogen generation that may circumvent the drawbacks and limitations of oxygen carriers already existing in the art.

SUMMARY

In an exemplary embodiment, an oxygen carrier is described. The oxygen carrier includes an alumina support, cerium oxide in an amount of 0.5 to 2 percent by weight (wt. %), and iron oxide in an amount of 5 to 35 wt. %, where the percent by weight is based on a total weight of the oxygen carrier. The cerium oxide and the iron oxide are doped on the alumina support. The oxygen carrier is in the form of layered particles having a longest dimension of 50 to 500 nm and the oxygen carrier is porous with an average pore volume of 0.01 to 0.05 cm$^3$/g and an average pore diameter of 10 to 20 nm. The iron oxide has an average crystallite size of 10 to 30 nm. The oxygen carrier includes a CeO$_2$ phase, an Al$_2$O$_3$ phase, an Fe$_2$O$_3$ phase, and an FeAl$_2$O$_4$ phase.

In some embodiments, the oxygen carrier has a Brunauer-Emmett-Teller surface area (BET) of 5 to 15 m$^2$/g.

In some embodiments, the oxygen carrier is porous and has a pore diameter of 10 to 20 nanometers (nm).

In some embodiments, the oxygen carrier consists of the CeO$_2$ phase, the Al$_2$O$_3$ phase, the Fe$_2$O$_3$ phase, and the FeAl$_2$O$_4$ phase.

In some embodiments, the oxygen carrier has a degree of crystallinity of 60 to 70% based on a ratio of crystal peak area to total area of an X-ray diffraction graph.

In some embodiments, the oxygen carrier comprises iron oxide in an amount of 8 to 12 wt.

In some embodiments, the oxygen carrier comprises iron oxide in an amount of 18 to 22 wt. %.

In some embodiments, the oxygen carrier comprises iron oxide in an amount of 28 to 32 wt. %.

In some embodiments, the iron oxide in the oxygen carrier is reduced from hematite (Fe$_2$O$_3$) to magnetite (Fe$_3$O$_4$) at a temperature of 370 to 410° C.

In some embodiments, the iron oxide in the oxygen carrier is reduced from magnetite (Fe$_3$O$_4$) to iron(II) oxide (FeO) at a temperature of 530 to 570° C.

In some embodiments, the iron oxide in the oxygen carrier is reduced from iron(II) oxide (FeO) to iron (Fe$^0$) at a temperature of 610 to 670° C.

In some embodiments, the oxygen carrier has an oxygen transport capacity release efficiency of 55 to 75% based on temperature-programmed reduction.

In some embodiments, the oxygen carrier has an oxygen transport capacity capture efficiency of 60 to 90% based on temperature-programmed oxidation.

In another embodiment, a method of methane conversion is described. The method includes contacting the oxygen carrier with methane for 1 to 30 seconds at a temperature of 600 to 700° C. in a reactor to reduce the oxygen carrier and produce at least one gas selected from the group consisting of carbon dioxide, carbon monoxide, water, and hydrogen in the reactor.

In some embodiments, the method further includes contacting the reduced oxygen carrier with water and/or air to regenerate the oxygen carrier and contacting the oxygen carrier with methane to reduce the oxygen carrier and contacting the reduced oxygen carrier with water and/or air to regenerate the oxygen carrier 8 to 12 times, where a methane conversion is at least 35% based on an initial amount of methane during the 8 to 12 times contacting.

In some embodiments, the reactor is at a pressure of 0.5 to 2 bar.

In some embodiments, 10 to 15 mL of a feed per gram of oxygen carrier is injected into the reactor.

In some embodiments, the reactor is selected from the group consisting of a fuel reactor, an air reactor, and a steam reactor.

In some embodiments, carbon dioxide is produced in an amount of at least 30 percent by weight (wt. %) based on an initial amount of methane.

In some embodiments, the oxygen carrier is made by a process including dissolving a cerium salt in water to form a cerium solution, coating the alumina support in the cerium solution to form a cerium-modified alumina support, drying the cerium-modified alumina support at 100 to 110° C. for 4 to 6 hours to form a dried cerium-modified alumina support, calcinating the dried cerium-modified alumina support at 450 to 550° C. for 2 to 4 hours to form a calcinated cerium-modified alumina support, dissolving an iron salt in water to form an iron solution, depositing the iron solution on the calcinated cerium-modified alumina support to form an iron/cerium-modified alumina support, drying the iron/cerium-modified alumina support at 100 to 110° C. for 4 to 6 hours to form a dried iron/cerium-modified alumina support, and calcinating the dried iron/cerium-modified alumina support at 800 to 900° C. for 2 to 4 hours to form the oxygen carrier.

The foregoing general description of the illustrative embodiments and the following detailed description thereof are merely exemplary aspects of the teachings of the present disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
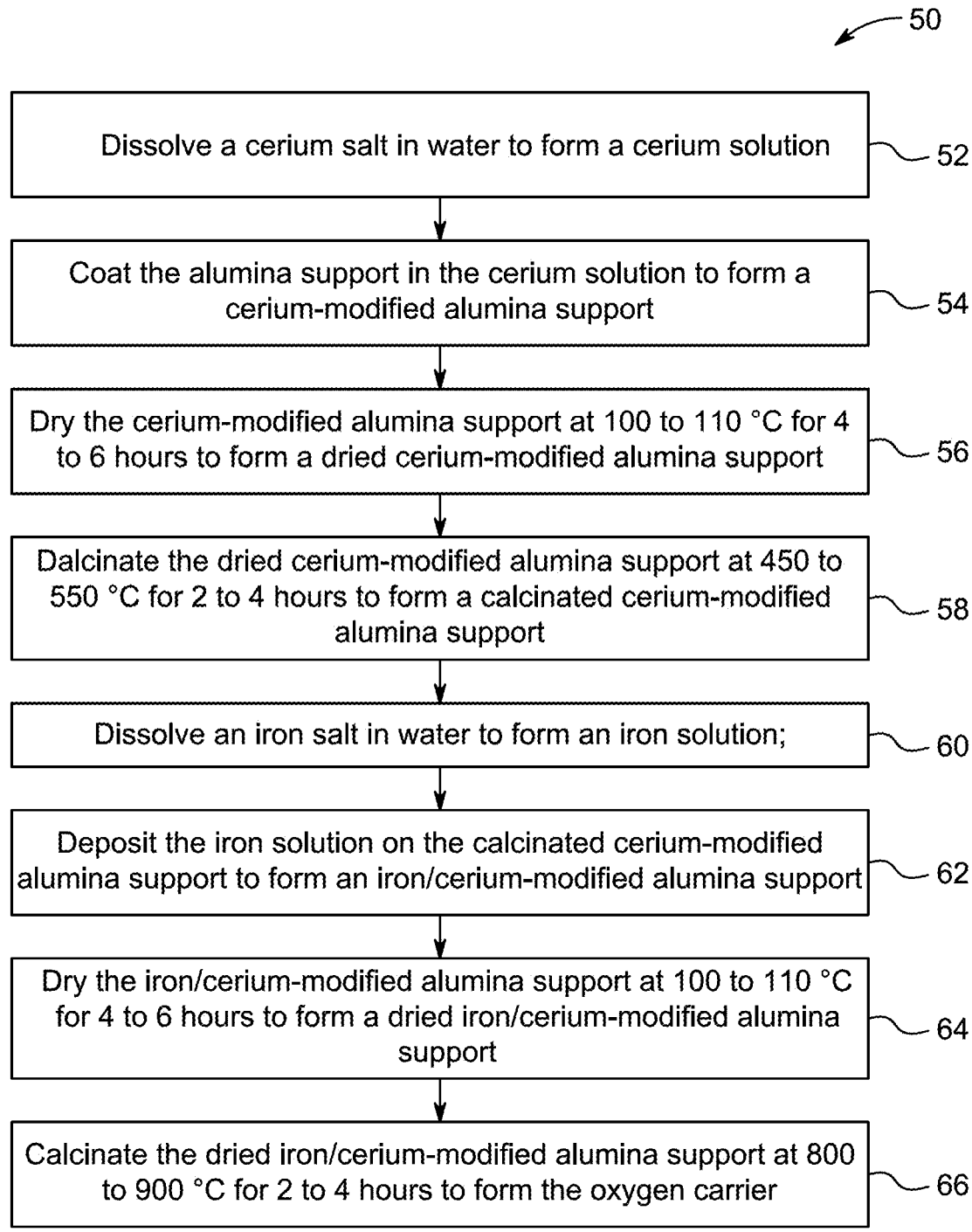
FIG. 1A illustrates a flowchart for a method of preparing of an oxygen carrier, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "room temperature" refers to a temperature range of 25±3 degrees Celsius (° C.).

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium and isotopes of carbon include $^{13}C$ and $^{14}C$. Isotopes of oxygen include $^{16}O$, $^{17}O$, and $^{18}O$. Isotopes of naturally occurring nickel $^{28}Ni$ include $^{58}Ni$, $^{60}Ni$, $^{61}Ni$, $^{62}Ni$, and $^{64}Ni$. Isotopically labeled compounds of the disclosure may generally be prepared by conventional techniques known to those skilled in the art or by processes analogous to those described herein, using an appropriate isotopically-labeled reagent in place of the non-labeled reagent otherwise employed.

As used herein the term "XRD" refers to X-ray diffraction, a scientific technique used to study the structure of materials. XRD is commonly used to identify crystalline phases of a substance, determine its crystal structure, and analyze the arrangement of atoms within a material.

As used herein, the term "average crystallite size" refers to the mean size of coherently diffracting crystalline domains within a material, typically expressed in nanometers (nm). It represents the average dimension of individual crystallites, which may be smaller than the overall particle size due to the presence of polycrystalline aggregates. The average crystallite size is commonly determined using XRD analysis, often calculated from the broadening of diffraction peaks using the Scherrer equation or other applicable models.

As used herein, the term "degree of crystallinity" refers to a proportion of a material that is present in a crystalline form as opposed to an amorphous (non-crystalline) form, typically expressed as a percentage. It indicates an extent of long-range atomic or molecular order within the material's structure.

As used herein, the term "crystal peak area" refers to an integrated area under a diffraction peak in an XRD pattern that corresponds to a specific crystalline plane of a material. The crystal peak area is indicative of relative abundance or intensity of a crystalline phase contributing to that specific reflection.

As used herein the term "mean particle size" refers to the average size of particles in a sample. It represents the typical diameter or size of individual particles in a powder, suspension, and/or colloidal system.

As used herein the term "SEM" refers to scanning electron microscopy, an imaging technique used to examine the surface morphology and topography of materials at high magnification and resolution.

As used herein, the term "calcination" refers to heating a compound to a high temperature, under a restricted supply of ambient oxygen. This is performed to remove impurities or volatile substances and to incur thermal decomposition.

As used herein, the term "BET" refers to the Brunauer-Emmett-Teller method, a widely used technique for determining surface area and porosity of materials. It is based on the adsorption of nitrogen gas onto a surface of a material and is employed to calculate specific surface area, pore volume, and pore size distribution.

As used herein, the term "surface area" refers to a total area of a surface of a material that is available for interaction with its environment. It is a measure of the extent of a material's surface exposed to external conditions, which can be used in determining reactivity, adsorption capacity, and/or other surface-related properties of a material.

As used herein, the term "porosity" refers to a measure of void or vacant spaces within a material.

As used herein, the term "average pore diameter" refers to the mean diameter of the pores within a porous material, typically expressed in nanometers (nm). It represents the average size of the void spaces or channels throughout the material's structure and is commonly determined using methods such as nitrogen adsorption/desorption analysis (e.g., Barrett-Joyner-Halenda (BJH) method).

As used herein, the term "average pore volume" refers to mean volume of pores within a porous material, typically expressed in units such as cubic centimeters per gram ($cm^3/g$). It represents cumulative internal pore space available within a material structure, averaged across all pores, and is determined using techniques such as nitrogen adsorption/desorption isotherms (e.g., BET or BJH analysis).

As used herein, the term "oxygen carrier" refers to a material or compound capable of reversibly releasing and accepting oxygen atoms or ions during chemical reactions within a redox cycle. Oxygen carriers are commonly utilized in processes, such as chemical looping combustion, catalytic oxidation and metal-air batteries, where they facilitate the transfer of oxygen without the direct use of molecular oxygen ($O_2$). These carriers may include, but are not limited to, metal oxides, perovskites, mixed metal oxides, and/or supported metal-based materials that undergo cyclic oxidation and reduction while maintaining structural integrity and reactivity.

As used herein, the term "hematite" refers to a crystalline form of iron(III) oxide ($Fe_2O_3$) characterized by a rhombohedral crystal structure. Hematite is the most thermodynamically stable form of iron oxide under ambient conditions and typically appears as a reddish-brown solid.

As used herein, the term "magnetite" refers to a mixed-valence iron oxide with the chemical formula $Fe_3O_4$, consisting of both $Fe^{2+}$ and $Fe^{3+}$ ions. Magnetite has an inverse spinel crystal structure and is known for its strong magnetic properties.

As used herein, the term "fuel reactor" refers to a reactor vessel in which a fuel, such as methane, coal or biomass, undergoes partial oxidation or combustion in the presence of an oxygen carrier or another oxidant. This process generates energy and often produces syngas or other valuable products.

As used herein, the term "air reactor" refers to a reactor vessel in which an oxygen carrier, after being reduced in the fuel reactor is re-oxidized by air or oxygen. This step restores the oxygen carrier to its oxidized state, enabling the continuation of the redox cycle in processes such as chemical looping combustion.

As used herein, the term "steam reactor" refers to a reactor where steam, typically in the presence of an oxygen carrier or a catalyst, is used to drive chemical reactions such as steam methane reforming or water-gas shift reactions. In such a reactor, steam is introduced to facilitate the conversion of hydrocarbons or other feedstocks into valuable products like hydrogen or syngas.

Aspects of present disclosure are directed to an oxygen carrier and more preferably an iron oxide/cerium oxide-aluminum oxide ($Fe_2O_3$/CeO—$Al_2O_3$) oxygen carrier for hydrogen production using chemical looping approach. This material offers enhanced redox performance, thermal stability, and oxygen transfer capacity, making it suitable for efficient and sustainable hydrogen generation. The synergistic interaction between iron oxide and cerium oxide, supported on an aluminum oxide matrix, contributes to improved reaction kinetics and prolonged cyclic stability over multiple redox cycles.

The oxygen carrier includes an alumina support, cerium oxide in an amount of 0.5 to 2 percent by weight (wt. %), preferably 0.6 to 1.9 wt. %, preferably 0.7 to 1.8 wt. %, preferably 0.8 to 1.7 wt. %, preferably 0.9 to 1.6 wt. %, preferably 1 to 1.5 wt. %, preferably 1.1 to 1.4 wt. %, and preferably 1.2 to 1.3 wt. %, and iron oxide in an amount of 5 to 35 wt. %, preferably 10 to 30 wt. %, preferably 15 to 25%, and preferably 17 to 23 wt. % where percent by weight is based on a total weight of the oxygen carrier.

In some embodiments, the oxygen carrier includes iron oxide in an amount of 8-12 wt. %, preferably 8.1-11.9 wt. %, preferably 8.2-11.8 wt. %, preferably 8.3-11.7 wt. %, preferably 8.4-11.6 wt. %, preferably 8.5-11.5 wt. %, preferably 8.6-11.4 wt. %, preferably 8.7-11.3 wt. %, preferably 8.8-11.2 wt. %, preferably 8.9-11.1 wt. %, preferably 9-11 wt. %, preferably 9.1-10.9 wt. %, preferably 9.2-10.8 wt. %, preferably 9.3-10.7 wt. %, preferably 9.4-10.6 wt. %, preferably 9.5-10.5 wt. %, preferably 9.6-10.4 wt. %, preferably 9.7-10.3 wt. %, preferably 9.8-10.2 wt. %, more preferably 9.9-10.1 wt. %, and yet more preferably about 10 wt. %.

In some embodiments, the oxygen carrier includes iron oxide in an amount of 18-22 wt. %, preferably 18.1-21.9 wt. %, preferably 18.2-21.8 wt. %, preferably 18.3-21.7 wt. %, preferably 18.4-21.6 wt. %, preferably 18.5-21.5 wt. %, preferably 18.6-21.4 wt. %, preferably 18.7-21.3 wt. %, preferably 18.8-21.2 wt. %, preferably 18.9-21.1 wt. %, preferably 19-21 wt. %, preferably 19.1-20.9 wt. %, preferably 19.2-20.8 wt. %, preferably 19.3-20.7 wt. %, preferably 19.4-20.6 wt. %, preferably 19.5-20.5 wt. %, preferably 19.6-20.4 wt. %, preferably 19.7-20.3 wt. %, preferably 19.8-20.2 wt. %, more preferably 19.9-20.1 wt. %, and yet more preferably about 20 wt. %.

In some embodiments, the oxygen carrier includes iron oxide in an amount of 28-32 wt. %, preferably 28.1-31.9 wt. %, preferably 28.2-31.8 wt. %, preferably 28.3-31.7 wt. %, preferably 28.4-31.6 wt. %, preferably 28.5-31.5 wt. %, preferably 28.6-31.4 wt. %, preferably 28.7-31.3 wt. %, preferably 28.8-31.2 wt. %, preferably 28.9-31.1 wt. %, preferably 29-31 wt. %, preferably 29.1-30.9 wt. %, preferably 29.2-30.8 wt. %, preferably 29.3-30.7 wt. %, preferably 29.4-30.6 wt. %, preferably 29.5-30.5 wt. %, preferably 29.6-30.4 wt. %, preferably 29.7-30.3 wt. %, preferably 29.8-30.2 wt. %, more preferably 29.9-30.1 wt. %, and yet more preferably about 30 wt. %.

The cerium oxide and the iron oxide are doped on the alumina support. The oxygen carrier is in the form of layered particles having a longest dimension of 50-500 nm, preferably 55-495 nm, preferably 60-490 nm, preferably 65-485 nm, preferably 70-480 nm, preferably 75-475 nm, preferably 80-470 nm, preferably 85-465 nm, preferably 90-460 nm, preferably 95-455 nm, preferably 100-450 nm, preferably 105-445 nm, preferably 110-440 nm, preferably 120-430 nm, preferably 130-420 nm, preferably 140-410 nm, preferably 150-400 nm, preferably 160-390 nm, preferably 170-380 nm, preferably 180-370 nm, preferably 190-360 nm, preferably 200-350 nm, preferably 210-340 nm, preferably 220-330 nm, preferably 230-320 nm, preferably 240-310 nm, preferably 250-300 nm, preferably 260-290 nm, and preferably 270-280 nm.

In some embodiments, the oxygen carrier has a Brunauer-Emmett-Teller (BET) surface area of 5-15 square meters per gram ($m^2/g$), preferably 5.1-14.9 $cm^2/g$, preferably 5.2-14.8 $m^2/g$, preferably 5.3-14.7 $m^2/g$, preferably 5.4-14.6 $m^2/g$, preferably 5.5-14.5 $m^2/g$, preferably 5.6-14.4 $m^2/g$, preferably 5.7-14.3 $m^2/g$, preferably 5.8-14.2 $m^2/g$, preferably 5.9-14.1 $m^2/g$, preferably 6-13 $m^2/g$, preferably 6.1-13.9 $m^2/g$, preferably 6.2-13.8 $m^2/g$, preferably 6.4-13.6 $m^2/g$, preferably 6.6-13.4 $m^2/g$, preferably 6.8-13.2 $m^2/g$ preferably 7.0-13 $m^2/g$, preferably 7.2-12.8 $m^2/g$, preferably 7.4-12.6 $m^2/g$, preferably 7.6-12.4 $m^2/g$, preferably 7.8-12.2 $m^2/g$, preferably 8-12 $m^2/g$, preferably 8.2-11.8 $m^2/g$, preferably 8.4-11.6 $m^2/g$, preferably 8.6-11.4 $m^2/g$, preferably 8.8-11.2 $m^2/g$, preferably 9-11 $m^2/g$, preferably 9.2-10.8 $m^2/g$, preferably 9.4-10.6 $m^2/g$, preferably 9.6-10.4 $m^2/g$, and preferably 9.8 to 10.2 $m^2/g$. In a preferred embodiment, the oxygen carrier has a BET surface area of about 10.24 $m^2/g$. In another preferred embodiment, the oxygen carrier has a BET surface area of about 10.68 $m^2/g$. In yet another preferred embodiment, the oxygen carrier has a BET surface area of about 6.09 $m^2/g$.

The oxygen carrier is porous and may has a pore diameter of 10 to 20 nm, preferably 10.1-19.9 nm, preferably 10.2-19.8 nm, preferably 10.3-19.7 nm, preferably 10.4-19.6 nm, preferably 10.5-19.5 nm, preferably 10.6-19.4 nm, preferably 10.7-19.3 nm, preferably 10.8-19.2 nm, preferably 10.9-19.1 nm, preferably 11-19 nm, preferably 11.2-18.8 nm, preferably 11.4-18.6 nm, preferably 11.6-18.4 nm, preferably 11.8-18.2 nm, preferably 12-18 nm, preferably 12.5-17.5 nm, preferably 13-17 nm, preferably 13.5-16.5 nm, preferably 14-16 nm, and preferably 14.5-15.5 nm. In some embodiments, the oxygen carrier is porous and has a pore diameter of 10 to 20 nm. In a preferred embodiment, the oxygen carrier is porous with an average pore diameter of about 15.16 nm. In another preferred embodiment, the oxygen carrier is porous with an average pore diameter of about 17.95 nm. In yet another preferred embodiment, the oxygen carrier is porous with an average pore diameter of about 10.94 nm.

The oxygen carrier is porous with an average pore volume of 0.01 to 0.05 cubic centimeters per gram ($cm^3/g$), preferably 0.011-0.049 $cm^3/g$, preferably 0.012-0.048 $cm^3/g$, preferably 0.013-0.047 $cm^3/g$, preferably 0.014-0.046 $cm^3/g$, preferably 0.015-0.045 $cm^3/g$, preferably 0.016-0.044 $cm^3/g$, preferably 0.017-0.043 $cm^3/g$, preferably 0.018-0.042 $cm^3/g$, preferably 0.019-0.041 $cm^3/g$, preferably 0.02-0.04 $cm^3/g$, preferably 0.021-0.039 $cm^3/g$, preferably 0.022-0.038 $cm^3/g$, preferably 0.023-0.037 $cm^3/g$, preferably 0.024-0.036 $cm^3/g$, preferably 0.025-0.035 $cm^3/g$, preferably 0.026-0.034 $cm^3/g$, preferably 0.027-0.033 $cm^3/g$, preferably 0.028-0.032 $cm^3/g$, and preferably 0.029-0.031 $cm^3/g$. In a preferred embodiment, the oxygen carrier is porous with an average pore volume of about 0.048 $cm^3/g$. In another preferred embodiment, the oxygen carrier is porous with an average pore volume of about 0.039 $cm^3/g$. In yet another preferred embodiment, the oxygen carrier is porous with an average pore volume of about 0.017 $cm^3/g$.

The oxygen carrier comprises a $CeO_2$ phase, an $Al_2O_3$ phase, an $Fe_2O_3$ phase, and an iron aluminate ($FeAl_2O_4$) phase. In some embodiments, the oxygen carrier consists of the $CeO_2$ phase, the $Al_2O_3$ phase, the $Fe_2O_3$ phase, and the iron aluminate ($FeAl_2O_4$) phase. The iron oxide has an average crystallite size of 10-30 nm, preferably 10.5-29.5 nm, preferably 11-29 nm, preferably 11.5-28.5 nm, preferably 12-28 nm, preferably 12.5-27.5 nm, preferably 13-27 nm, preferably 13.5-26.5 nm, preferably 14-26 nm, preferably 14.5-25.5 nm, preferably 15-25 nm, preferably 15.5-24.5 nm, preferably 16-24 nm, preferably 16.5-23.5 nm, preferably 17-23 nm, preferably 17.5-22.5 nm, preferably 18-22 nm, preferably 18.5-21.5 nm, preferably 19-21 nm, and preferably 19.5-20.5 nm.

In some embodiments, the oxygen carrier has a degree of crystallinity of 60 to 70%, preferably 61 to 69%, preferably 62 to 68%, preferably 63 to 67%, and preferably 64 to 66% based on a ratio of crystal peak area to total area of an X-ray diffraction graph.

In some embodiments, the iron oxide in the oxygen carrier is reduced from hematite ($Fe_2O_3$) to magnetite ($Fe_3O_4$) at a temperature of 370-410° C., preferably 371-409° C., preferably 372-408° C., preferably 373-407° C., preferably 374-406° C., preferably 375-405° C., preferably 376-404° C., preferably 377-403° C., preferably 378-402° C., preferably 379-401° C., preferably 380-400° C., preferably 381-399° C., preferably 382-398° C., preferably 383-397° C. preferably 384-396° C., preferably 385-395° C., preferably 386-394° C., preferably 387-393° C., preferably 388-392° C., preferably 389-391° C., and preferably about 390° C.

In some embodiments, the iron oxide in the oxygen carrier is reduced from magnetite ($Fe_3O_4$) to iron(II) oxide (FeO) at a temperature of 530-570° C., preferably 531-569° C., preferably 532-568° C., preferably 533-567° C., preferably 534-566° C., preferably 535-565° C., preferably 536-564° C., preferably 537-563° C., preferably 538-562° C., preferably 539-561° C., preferably 540-560° C., preferably 541-559° C., preferably 542-558° C., preferably 543-557° C., preferably 544-556° C., preferably 545-555° C., preferably 546-554° C., preferably 547-553° C., preferably 548-552° C., preferably 549-551° C., and preferably about 550° C.

In some embodiments, the iron oxide in the oxygen carrier is reduced from iron(II) oxide (FeO) to iron ($Fe^0$) at a temperature of 610-670° C., preferably 611-669° C., preferably 612-668° C., preferably 613-667° C., preferably 614-666° C., preferably 615-665° C., preferably 616-664° C., preferably 617-663° C., preferably 618-662° C., preferably 619-661° C., preferably 620-660° C., preferably 621-659° C., preferably 622-658° C., preferably 623-657° C., preferably 624-656° C., preferably 625-655° C., preferably 626-654° C., preferably 627-653° C., preferably 628-652° C., preferably 629-651° C., preferably 630-650° C., preferably 631-649° C., preferably 632-648° C., preferably 633-647° C., preferably 634-646° C., preferably 635-645° C., preferably 636-644° C., preferably 637-643° C., preferably 638-642° C., preferably 639-641° C., and preferably about 640° C.

In some embodiments, the oxygen carrier has an oxygen transport capacity release efficiency of 55-75%, preferably 56-74%, preferably 57-73%, preferably 58-72%, preferably 59-71%, preferably 60-70%, preferably 61-69%, preferably 62-68%, preferably 63-67%, and preferably 64-66% based on temperature-programmed reduction. In some embodiments, the oxygen carrier has an oxygen transport capacity capture efficiency of 60 to 90%, preferably 61-89%, preferably 62-88%, preferably 63-87 preferably 64-86%, preferably 65-85%, preferably 66-84%, preferably 67-83%, preferably 68-82%, preferably 69-81%, preferably 70-80%, preferably 71-79%, preferably 72-78%, preferably 73-77%, and preferably 74-76% based on temperature-programmed oxidation. In a preferred embodiment, the oxygen carrier has a maximum oxygen transport capacity release efficiency of about 73.83% and a maximum oxygen transport capacity capture efficiency of about 85.43% based on temperature-programmed reduction and temperature-programmed oxidation, respectively.

In another embodiment, a method of methane conversion is described. In some embodiments, the method includes contacting the oxygen carrier with methane for 1 to 30 seconds (sec), preferably 2-29 sec, preferably 3-28 sec, preferably 4-27 sec, preferably 5-26 sec, preferably 6-25 sec, preferably 7-24 sec, preferably 8-23 sec, preferably 9-22 sec, preferably 10-21 sec, preferably 11-20 sec, preferably 12-19 sec, preferably 13-18 sec, preferably 14-17 sec, and preferably 15-16 sec at a temperature of 600 to 700° C., preferably 610-690° C., preferably 620-680° C., preferably 630-670° C. and preferably 640-660° C. in a reactor to reduce the oxygen carrier and produce at least one gas selected from the group consisting of carbon dioxide, carbon monoxide, water, and hydrogen in the reactor.

In some embodiments, the method further includes contacting the reduced oxygen carrier with water and/or air to regenerate the oxygen carrier and contacting the oxygen carrier with methane to reduce the oxygen carrier and contacting the reduced oxygen carrier with water and/or air to regenerate the oxygen carrier 8-12 times, preferably 9-11 times, and about preferably 10 times where a methane conversion is at least 35%, preferably at least 40%, preferably at least 45%, preferably at least 50%, preferably at least 55%, preferably at least 60%, preferably at least 65%, preferably at least 70%, and preferably at least 75% based on an initial amount of methane during the 8 to 12 times contacting.

In some embodiments, the reactor is selected from the group consisting of a fuel reactor, an air reactor, and a steam reactor. In other embodiments, the reactor may be any reactor known in the art. In some embodiments, the reactor is at a pressure of 0.5 to 2 bar, preferably 0.6-1.9 bar, preferably 0.7-1.8 bar, preferably 0.8-1.7 bar, preferably 0.9-1.6 bar, preferably 1-1.5 bar, preferably 1.1-1.4 bar, and preferably 1.2-1.3. In a preferred embodiment, the reactor is at a pressure of about 1 bar.

In some embodiments, 10 to 15 mL of a feed per gram of oxygen carrier is injected into the reactor. In some embodiments, 10-15 milliliters per gram (mL/g), preferably 10.5-14.5 mL/g, preferably 11-14 mL/g, preferably 11.5-13.5 mL/g, preferably 12-13 mL of a feed per gram of oxygen carrier is injected into the reactor. In a preferred embodiment, about 12.5 mL of a feed per gram of oxygen carrier is injected into the reactor. In some embodiments, the oxygen carrier demonstrates a decrease in CO levels, along with increased production of $H_2$ (hydrogen) and $CO_2$ (carbon dioxide) compared to other oxygen carriers. In some embodiments, the oxygen carrier shows a greater potential for $CO_2$ generation than alternative oxygen carrier materials.

In some embodiments, carbon dioxide ($CO_2$) is produced in an amount of at least 30 percent by weight (wt. %), preferably at least 35 wt. %, preferably at least 40 wt. %, preferably at least 45 wt. %, preferably at least 50 wt. %, preferably at least 55 wt. %, preferably at least 60 wt. %, preferably at least 65 wt. %, preferably at least 70 wt. %, and preferably at least 75 wt. % based on an initial amount of methane.

FIG. 1A illustrates a flowchart of a method 50 of preparing the oxygen carrier. The order in which the method 50 is described is not intended to be construed as a limitation, and any number of the method steps described can be combined to implement the method 50. Additionally, individual steps may be removed or skipped from method 50 without departing from the spirit and scope of the present disclosure.

At step 52, the method 50 includes dissolving a cerium salt in water to form a cerium solution. In some embodiments, the cerium salts may include, but is not limited to, cerium(III) nitrate ($Ce(NO_3)_3$), cerium(III) nitrate hexahydrate ($Ce(NO_3)_3 \cdot 6H_2O$), cerium(IV) ammonium nitrate (($NH_4)_2Ce(NO_3)_6$), cerium(III) chloride ($CeCl_3$), cerium (IV) sulfate ($Ce(SO_4)_2$), cerium(III) acetate ($Ce(CH_3COO)_3$), cerium(III) oxalate ($Ce_2(C_2O_4)_3$), cerium(III) carbonate ($Ce_2(CO_3)_3$), cerium(III) hydroxide ($Ce(OH)_3$), a combination thereof, and the like. In a preferred embodiment, the cerium salt is cerium(III) nitrate hexahydrate ($Ce(NO_3)_3 \cdot 6H_2O$).

At step 54, the method 50 includes coating the alumina support in the cerium solution to form a cerium-modified alumina support. In alternative embodiments, other support material including, but not limited to, In some embodiments, the alumina support may be coated through various techniques including, but not limited to, wet impregnation, dip coating, spray coating, sol-gel processing, a combination thereof, and the like, depending on the desired cerium loading and dispersion. In a preferred embodiment, commercial available $Al_2O_3$ is taken and the cerium solution is slowly dripping onto it under continuous stirring.

At step 56, the method 50 includes drying the cerium-modified alumina support at 100 to 110° C. for 4 to 6 hours (h) to form a dried cerium-modified alumina support. In some embodiments, the method includes drying the cerium-modified alumina support at a temperature from 100-110° C., preferably 101-109° C., preferably 102-108° C., preferably 103-107° C., more preferably 104-106° C., and yet more preferably about 105° C. for 4-6 h, preferably 4.5-5.5 h, and more preferably about 5 h. In a preferred embodiment, the cerium-modified alumina support is dried at 105° C. for 5 h to form the dried cerium-modified alumina support.

At step 58, the method 50 includes calcinating the dried cerium-modified alumina support at 450 to 550° C., for 2 to 4 h to form a calcinated cerium-modified alumina support.

In some embodiments, the calcination is carried out by heating the dried cerium-modified alumina support to a high temperature, under a restricted supply of ambient oxygen. This is performed to remove impurities or volatile substances and to incur thermal decomposition. Typically, the calcination is carried out in a furnace preferably equipped with a temperature control system, which may provide a heating rate of up to 50° C. per minute (° C./min), preferably up to 40° C./min, preferably up to 30° C./min, preferably up to 20° C./min, preferably up to 10° C./min, preferably up to 5° C./min, preferably up to 2° C./min, and preferably up to 1° C./min.

In some embodiments, calcinating the dried cerium-modified alumina support is carried at a temperature of 450-550° C., preferably 455-545° C., preferably 460-540° C., preferably 465-535° C., preferably 470-530° C., preferably 475-525° C., preferably 480-520° C., preferably 485-515° C., preferably 490-510° C., more preferably 495-505° C., and yet more preferably about 500° C. for 2-4 h, preferably 2.5-3.5 h, and more preferably about 3 h to form a calcinated cerium-modified alumina support. In a preferred embodiment, the cerium-modified alumina support is calcinated at 500° C. for 3 h to form the calcinated cerium-modified alumina support.

At step 60, the method 50 includes dissolving an iron salt in water to form an iron solution. In some embodiments, iron salt may include, but is not limited to, iron(II) sulfate ($FeSO_4$), iron(II) nitrate ($Fe(NO_3)_2$), iron(II) acetate ($Fe(CH_3COO)_2$), iron(II) oxalate ($FeC_2O_4$), iron(II) carbonate ($FeCO_3$), iron(II) phosphate ($Fe_3(PO_4)_2$), iron(II) hydroxide ($Fe(OH)_2$), iron(III) nitrate ($Fe(NO_3)_3$), iron(III) chloride ($FeCl_3$), iron(III) sulfate ($Fe_2(SO_4)_3$), iron(III) phosphate ($FePO_4$), iron(III) acetate ($Fe(CH_3COO)_3$), iron(III) citrate ($FeC_6H_5O_7$), iron(III) oxalate ($Fe_2(C_2O_4)_3$), iron(III) hydroxide ($Fe(OH)_3$), a combination thereof, and the like. The water may be tap water, distilled water, double-distilled water, deionized water, deionized distilled water, reverse osmosis water, a combination thereof, and/or some other water. In a preferred embodiment, the iron salt is $Fe(NO_3)_2 \cdot 6H_2O$ and the water is deionized water.

At step 62, the method 50 includes depositing the iron solution on the calcinated cerium-modified alumina support to form an iron/cerium-modified alumina support. In some embodiments, the method of depositing the iron solution onto the calcinated cerium-modified alumina support to form an iron/cerium-modified alumina support may be carried out using various methods including, but not limited to, incipient wetness impregnation, wet impregnation, co-impregnation, sol-gel method, spray coating, spray drying method, a combination thereof, and/or any other deposition methods known in the art. In some embodiments, successive incipient wetness impregnation is employed, wherein 5 wt. % of iron is added in each cycle to gradually build up the desired iron loadings of 10 wt. %, 20 wt. %, and 30 wt. %.

At step 64, the method 50 includes drying the iron/cerium-modified alumina support at 100 to 110° C. for 4 to 6 h to form a dried iron/cerium-modified alumina support. In some embodiments, various methods of drying the iron/cerium-modified alumina support may include, but is not limited to, conventional oven drying, vacuum drying, microwave-assisted drying, infrared drying, rotary drying, freeze drying, spray drying, solar drying, a combination thereof, and the like. In some embodiments, the drying was carried out at temperature of 100-110° C., preferably 101-109° C., preferably 102-108° C., preferably 103-107° C., more preferably 104-106° C., and yet more preferably about 105° C. for 4-6 h, preferably 4.5-5.5 h, and more preferably about 5 h. In a preferred embodiment, the drying is carried out at 105° C. for 5 h to form the dried iron/cerium-modified alumina support.

At step 66, the method 50 includes calcinating the dried iron/cerium-modified alumina support at 800 to 900° C. for 2 to 4 h to form the oxygen carrier. In some embodiments, calcinating is carried out at a temperature of from 800-900° C., preferably 805-895° C., preferably 810-890° C., preferably 815-885° C., preferably 820-880° C., preferably 825-875° C., preferably 830-870° C., preferably 835-865° C., preferably 840-860° C., more preferably 845-855° C., and yet more preferably about 850° C. for 2-4 h, preferably 2.5-3.5 h, and preferably about 3 h. In a preferred embodiment, the dried iron/cerium-modified alumina support is calcined at 850° C. for 3 h to form the oxygen carrier.

EXAMPLES

The following examples describe and demonstrate an oxygen carrier including an alumina support. The examples are provided solely for illustration and are not to be construed as limitations of the present disclosure, as many variations thereof are possible without departing from the spirit and scope of the present disclosure.

Example 1: Oxygen Carrier Preparation

An oxygen carrier was synthesized using the incipient wetness impregnation method with a sequential iron loading strategy. The oxygen carrier (OC) was prepared utilizing commercially available alumina ($Al_2O_3$) without pre-treatment. Initially, the support was modified with 1 weight percent (wt. %) of cerium oxide ($CeO_2$). The addition of iron (Fe) as a catalytically active component was performed subsequent to modification of the support with $CeO_2$. To modify the support, a cerium precursor solution was prepared by dissolving a quantity of cerium nitrate nonahydrate ($CeN_3O_9 \cdot 6H_2O$, Sigma-Aldrich, 99.99%) in deionized water. The resulting solution was incrementally added to $Al_2O_3$ under continuous stirring. The cerium-modified alumina (Ce—Al) was then dried at 105° C. for 5 hours and subsequently calcined at 500° C. for 3 hours.

Thereafter, an iron precursor solution was prepared by dissolving an amount of iron(II) nitrate hexahydrate ($Fe(NO_3)_2 \cdot 6H_2O$, Sigma-Aldrich, 99%) in deionized water. Successive incipient wetness impregnation steps were performed by adding 5 wt. % iron (Fe) in each cycle to achieve total Fe loadings of 10 wt. %, 20 wt. %, and 30 wt. %. After each impregnation cycle, the intermediate material was dried at 105° C. for 5 hours and calcined at 850° C. for 3 hours. The oxygen carriers prepared with iron loadings of 10 wt. %, 20 wt. %, and 30 wt. % were designated as F10Ce—Al, F20Ce—Al, and F30Ce—Al, respectively.

Example 2: Oxygen Carrier Characterizations

Elemental composition of the synthesized oxygen carriers was analysed using an M4 Tornado X-ray fluorescence (XRF) spectrometer from Bruker to verify the iron (Fe) content. Surface morphology of the oxygen carriers was examined using scanning electron microscopy (SEM) performed on a JSM-6610LV instrument from JEOL, equipped with an energy dispersive X-ray (EDX) spectrometer from Oxford Instruments. Prior to SEM analysis, all samples were coated with a sputtered gold film to mitigate free charging effects.

X-ray diffraction (XRD) analysis was conducted using a Rigaku diffractometer to determine crystalline properties of both fresh and spent oxygen carrier materials. The measurements employed a Cu-Kα radiation source operated at 40 kV and 15 mA. Scanning was performed over a 2θ range of 10 to 80° with a step size of 0.02°. Phase identification was carried out using X'Pert HighScore Plus software in conjunction with the JCPDS database.

Textural characterization of both fresh and spent oxygen carriers was conducted using a Micromeritics ASAP 2020 instrument, with nitrogen employed as the adsorbate gas. The Brunauer-Emmett-Teller (BET) method was used to determine surface area, while the Barrett-Joyner-Halenda (BJH) method was applied to obtain pore volume and pore diameter distributions.

To evaluate the reducibility and oxidizability of the oxygen carriers, temperature-programmed reduction (TPR) and temperature-programmed oxidation (TPO) analyses were performed. For TPR, approximately 20 milligrams (mg) of the oxygen carrier sample was placed in a thermogravimetric analyser (TGA) using an SDT Q600 instrument (Texas Instruments, USA) and heated to 1000° C. at a rate of 10° C. per minute under a reducing atmosphere composed of 10% hydrogen ($H_2$) and 90% nitrogen ($N_2$). TPO was then conducted by switching the gas flow to air and heating the sample to 700° C. at 10° C. per minute to re-oxidize the reduced metal species. A redox cycling test was performed by repeating the TPR and TPO procedures for five consecutive cycles. The oxygen transport capacity of the oxygen carrier was determined based on TPR and TPO analyses.

Example 3: Oxygen Carrier Performance

Figure 1B:
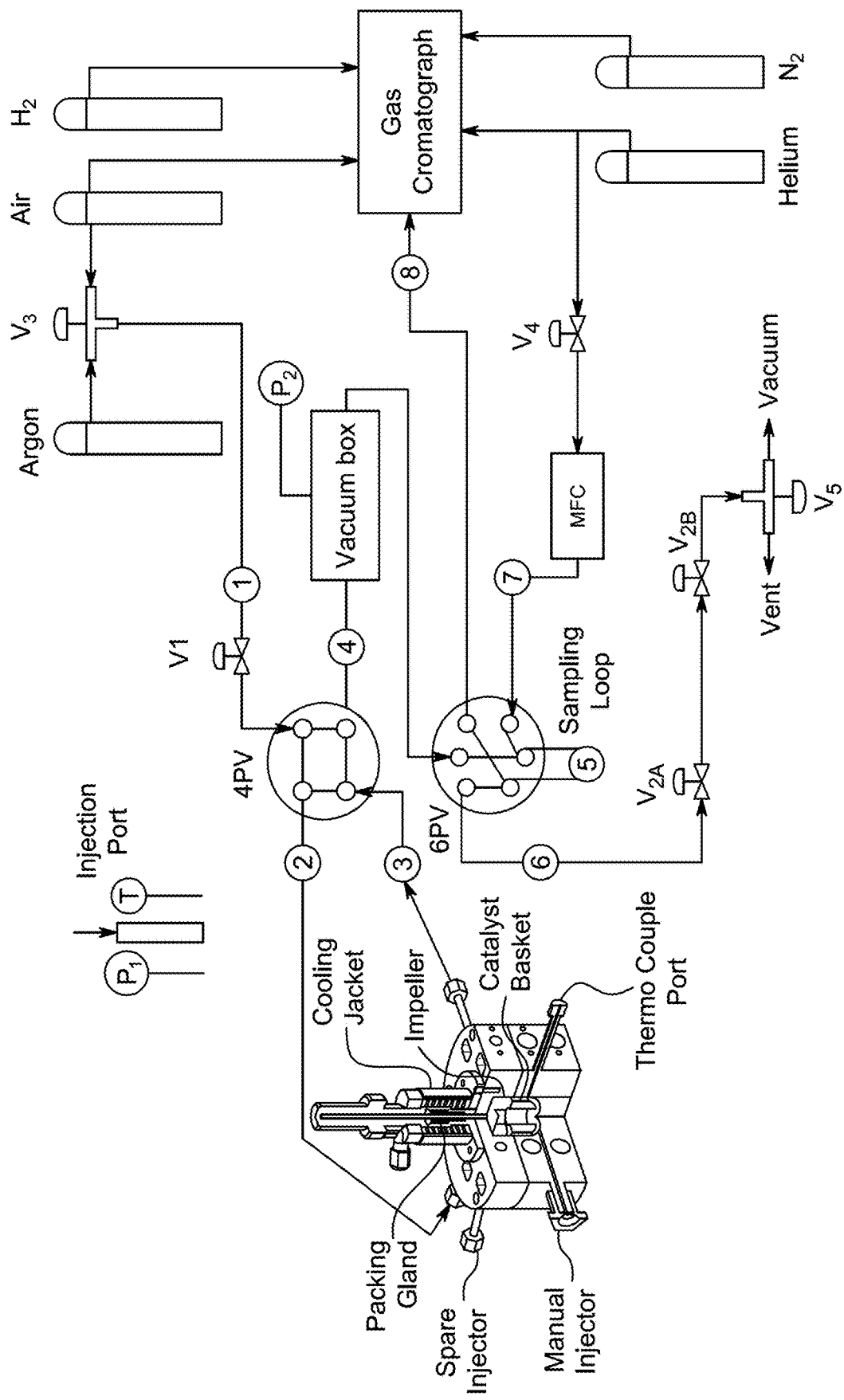
FIG. 1B is a schematic diagram of a CREC Riser Simulator, including a fluidized bed system designed to simulate a chemical looping process, according to certain embodiments.
Figure 2:
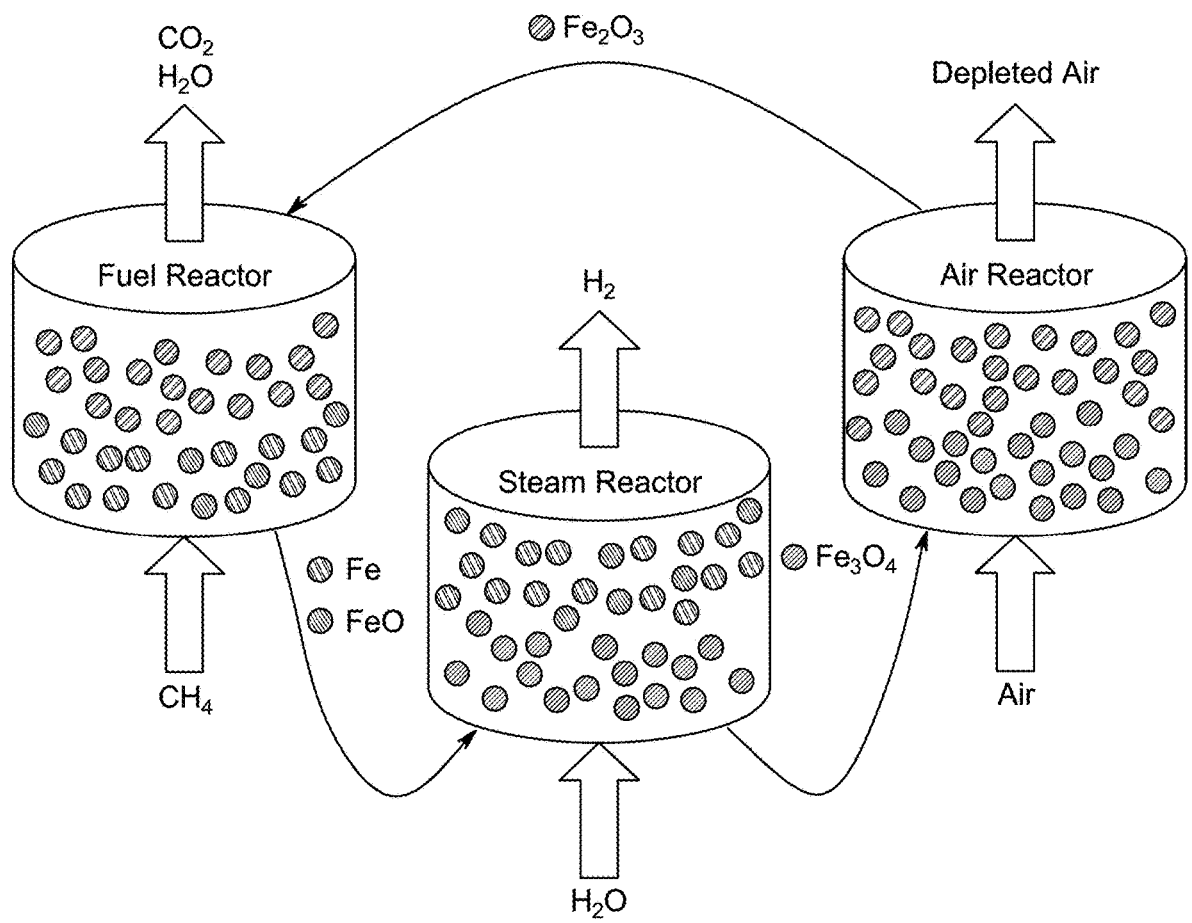
FIG. 2 is a schematic representation of a process flow and reactor sequence, according to certain embodiments.

Performance of the synthesized oxygen carrier was evaluated using a bench-scale fluidized CREC Riser Simulator, as illustrated in FIG. 1B. The simulator can replicate fluidized bed conditions and simulate three distinct reactor environments: a fuel reactor for oxygen carrier reduction, a steam reactor for hydrogen generation, and an air reactor for reoxidation of the oxygen carrier to its oxide state. A schematic representation of the process flow and reactor sequence is shown in FIG. 2.

For each test, 0.8 grams of the oxygen carrier was introduced into the reactor, which was sealed and purged with argon to establish an oxygen-free atmosphere. The reactor was subsequently heated to a set temperature within the range of 500 to 650° C. During the fuel reactor cycle, a volume of 10 millilitres (mL) of methane ($CH_4$) was injected using a syringe, and the reaction was allowed to proceed for a duration of 5 to 25 seconds. At the end of the reaction time, the system automatically terminated the reaction and transferred the resulting product gases to a vacuum collection box for analysis. The collected gas sample was pressurized with argon and analysed using an Agilent 7890A gas chromatograph (GC) equipped with a flame ionization detector (FID) and a thermal conductivity detector (TCD), configured for the detection and quantification of $CH_4$, $H_2$, CO, and $CO_2$. The GC data were used to determine methane conversion and $CO_2$ yield based on equations 1 and 2.

$$CH_4 \text{ conversion} = \frac{CH_{4,in} - CH_{4,out}}{CH_{4,in}} \times 100\% \tag{1}$$

$$CO_2 \text{ yield} = \frac{\text{mol of } CO_2}{\text{mol of } CH_{4,in}} \times 100\% \tag{2}$$

Prior to the steam reactor step, both the reactor and the vacuum box were purged with argon to remove residual gases. A volume of 60 microliters (L) of water was then injected into the reactor to initiate the steam reaction for hydrogen production. Following the steam reaction, the oxygen carrier was re-oxidized to regenerate the oxide form by introducing a continuous flow of air into the reactor for 15 minutes. After each cycle, the reactor and vacuum box were thoroughly cleaned by argon flushing to prevent cross-contamination of products between successive reactions.

Figure 3A:
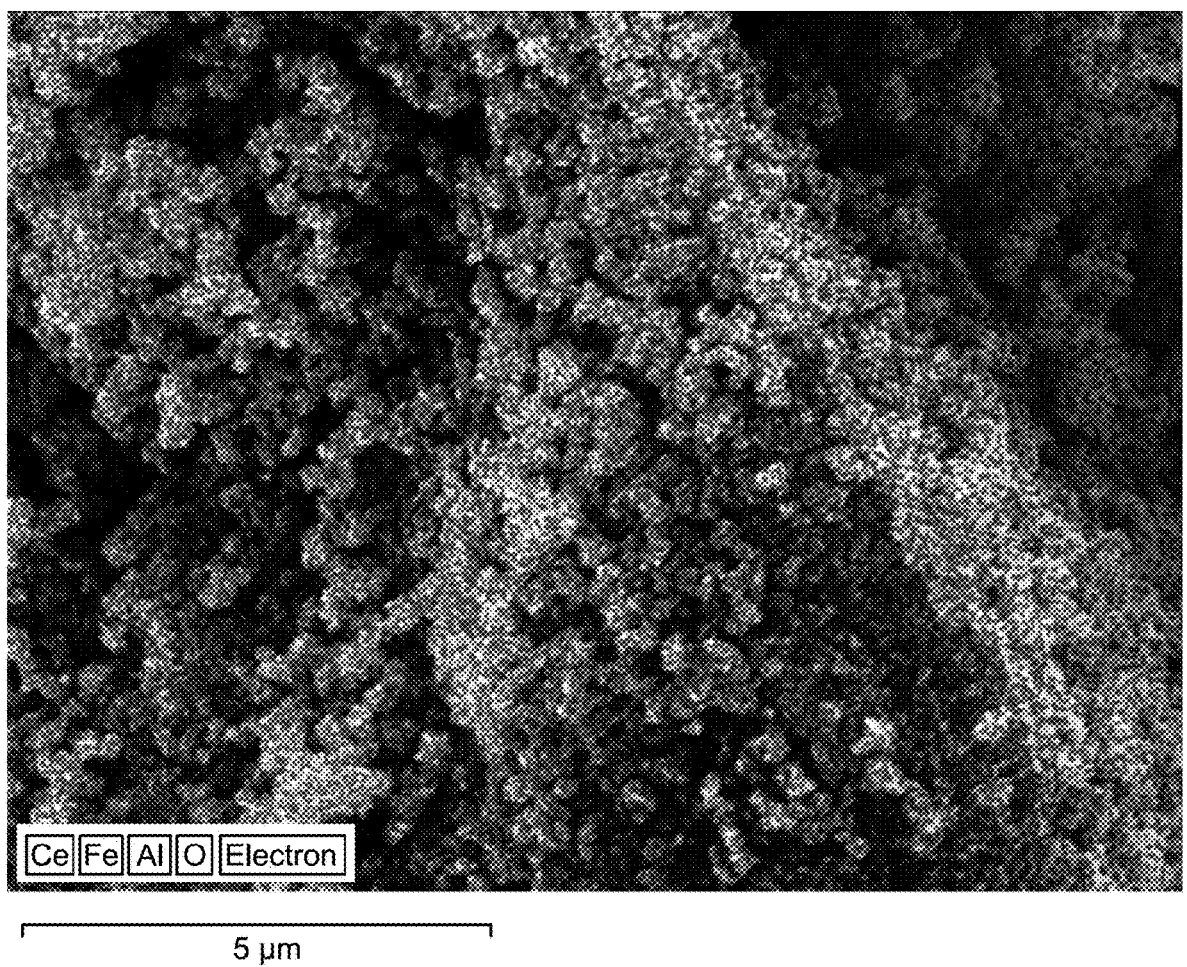
FIG. 3A is a scanning electron microscopy (SEM) image of a fresh F30Ce—Al oxygen carrier, according to certain embodiments.
Figure 3B:
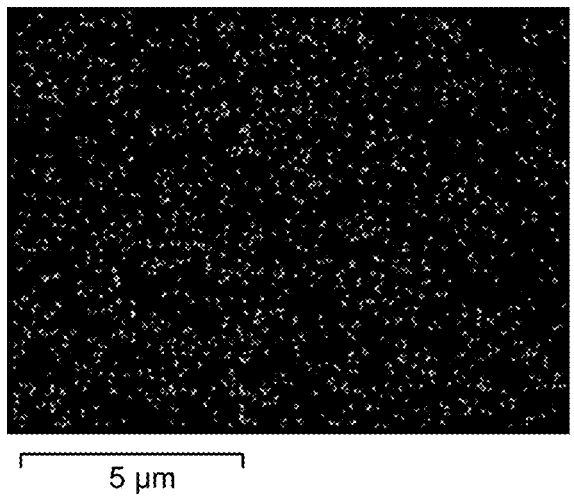
FIG. 3B illustrates energy-dispersive X-ray spectroscopy (EDX) mapping of cerium (Ce) on the surface of the fresh F30Ce—Al oxygen carrier, according to certain embodiments.
Figure 3C:
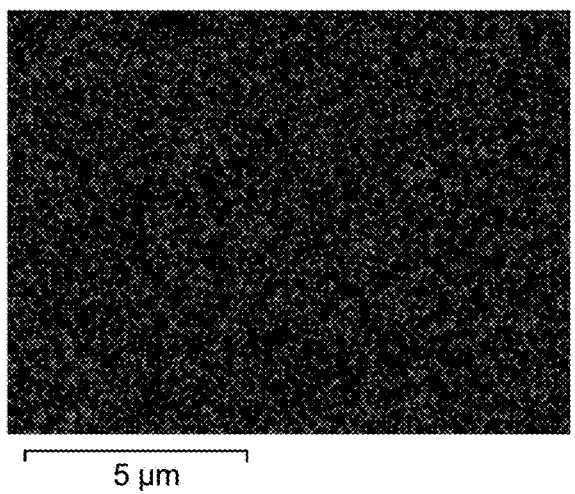
FIG. 3C illustrates EDX mapping of iron (Fe) on the surface of the fresh F30Ce—Al oxygen carrier, according to certain embodiments.
Figure 3D:
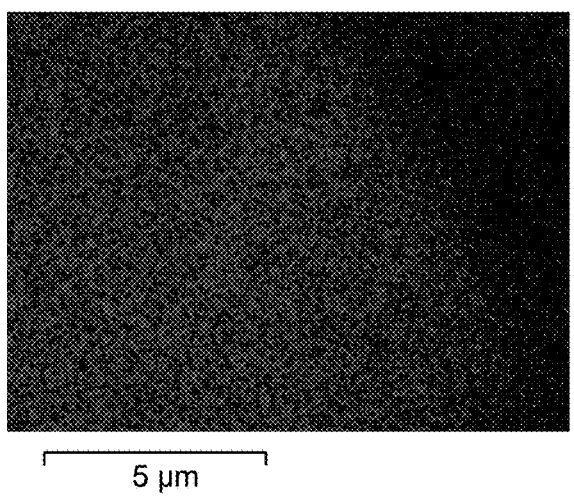
FIG. 3D illustrates EDX mapping of aluminum (Al) on the surface of the fresh F30Ce—Al oxygen carrier, according to certain embodiments.
Figure 3E:
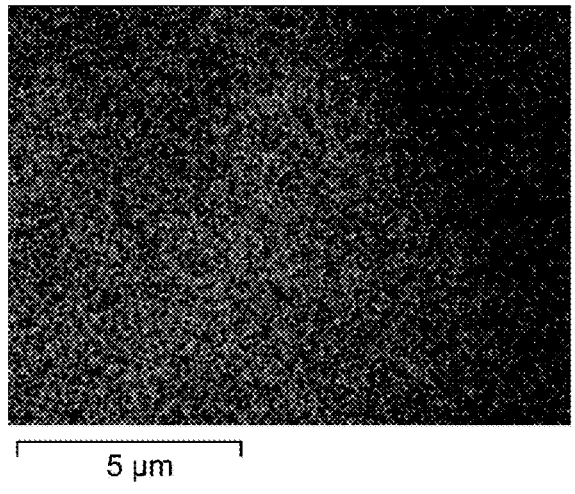
FIG. 3E illustrates EDX mapping of oxygen (O) on the surface of the fresh F30Ce—Al oxygen carrier, according to certain embodiments.

Metal loading of the oxygen carrier was quantified using X-ray fluorescence (XRF) analysis. As listed in Table 1, the measured metal contents were in close agreement with the targeted compositions. The surface morphology of the oxygen carrier was examined by scanning electron microscopy coupled with energy-dispersive X-ray spectroscopy (SEM-EDX), as shown in FIG. 3A. Elemental mapping by EDX confirmed the presence of cerium (Ce), as illustrated in FIG. 3B, and iron (Fe), as illustrated in FIG. 3C, on the alumina ($Al_2O_3$) support, as seen in FIGS. 3D-3E.

Spatial distribution of both Ce and Fe on the support was determined to be uniform, a feature that helps to minimize agglomeration during high-temperature operation. Incorporation of cerium onto the alumina support was seen to alter surface characteristics of the oxygen carrier material, reducing the mobility of Fe and subsequently limiting the likelihood of agglomeration. Inclusion of Ce on alumina support has been seen to suppress metal agglomeration under reforming and combustion conditions [Adnan, M. A. et al., In-situ reforming and combustion of liquid fuel using MnOx/Ce-γ $Al_2O_3$ oxygen carrier in a chemical looping combustion process, Int J Hydrogen Energy, 2021, 46, 50, 25500-25512, which is incorporated herein by reference it its entirety].

TABLE 1

Metal loading analysis of the prepared Fe—Ce—Al oxygen carrier

| Oxygen | $CeO_2$ loading (wt. %) | | $Fe_2O_3$ loading (wt. %) | |
|---|---|---|---|---|
| carrier | Target | Actual XRF | Target | Actual XRF |
| F00Ce—Al | 1 | 1.67 | — | — |
| F10Ce—Al | 1 | 1.41 | 10 | 8.73 |
| F20Ce—Al | 1 | 1.15 | 20 | 18.20 |
| F30Ce—Al | 1 | 0.88 | 30 | 28.14 |

Textural characteristics, including surface area, average pore diameter, and pore volume, were analyzed and are listed in Table 2. The BET surface area of the Ce-modified alumina support (Ce—Al) was slightly lower than that of unmodified alumina, consistent with previous reports, indicating that the crystallization of aluminum oxide and cerium oxide during calcination may initiate at an interface between the two oxide phases. Despite the marginal reduction in surface area, the addition of Ce was observed to slightly improve pore volume and pore diameter. Analogous improvements in porosity have been reported in systems where zirconia ($ZrO_2$) was modified with lanthanum oxide ($La_2O_3$) and tungsten oxide ($WO_3$) [Al-Fatesh, A. S. et al., Catalytic methane decomposition over $ZrO_2$ supported iron catalysts: Effect of $WO_3$ and $La_2O_3$ addition on catalytic activity and stability, *Renew Energy*, 2020, 155, 969-978, which is incorporated herein by reference in its entirety].

A comparative analysis of textural properties between fresh and spent oxygen carriers following exposure to the steam reactor is also included in Table 2. For F20Ce—Al, a decrease in BET surface area and pore volume was observed. In contrast, F10Ce—Al and F30Ce—Al exhibited increases in BET surface area and pore volume. Variations were attributed to the interaction of iron oxide with methane, which, during reduction, leads to the formation of additional pores due to the evolution of gaseous products such as $CO_2$, CO, and $H_2$ [Korus, A. et al., Pore development during $CO_2$ and $H_2O$ activation associated with the catalytic role of inherent inorganics in sewage sludge char and its performance during the reforming of volatiles, *Chemical Engineering Journal*, 2022, 446, 137298, which is incorporated herein by reference in its entirety]. F20Ce—Al displayed the highest propensity for catalytic reactions; however, carbon accumulation resulting from such activity was found to partially obstruct the surface area. SEM-EDX analysis of the spent oxygen carriers revealed slight carbon deposition, which was deemed removable through subsequent exposure to oxidizing conditions in the air reactor, ensuring minimal interference in the following operational cycle.

Figure 4:
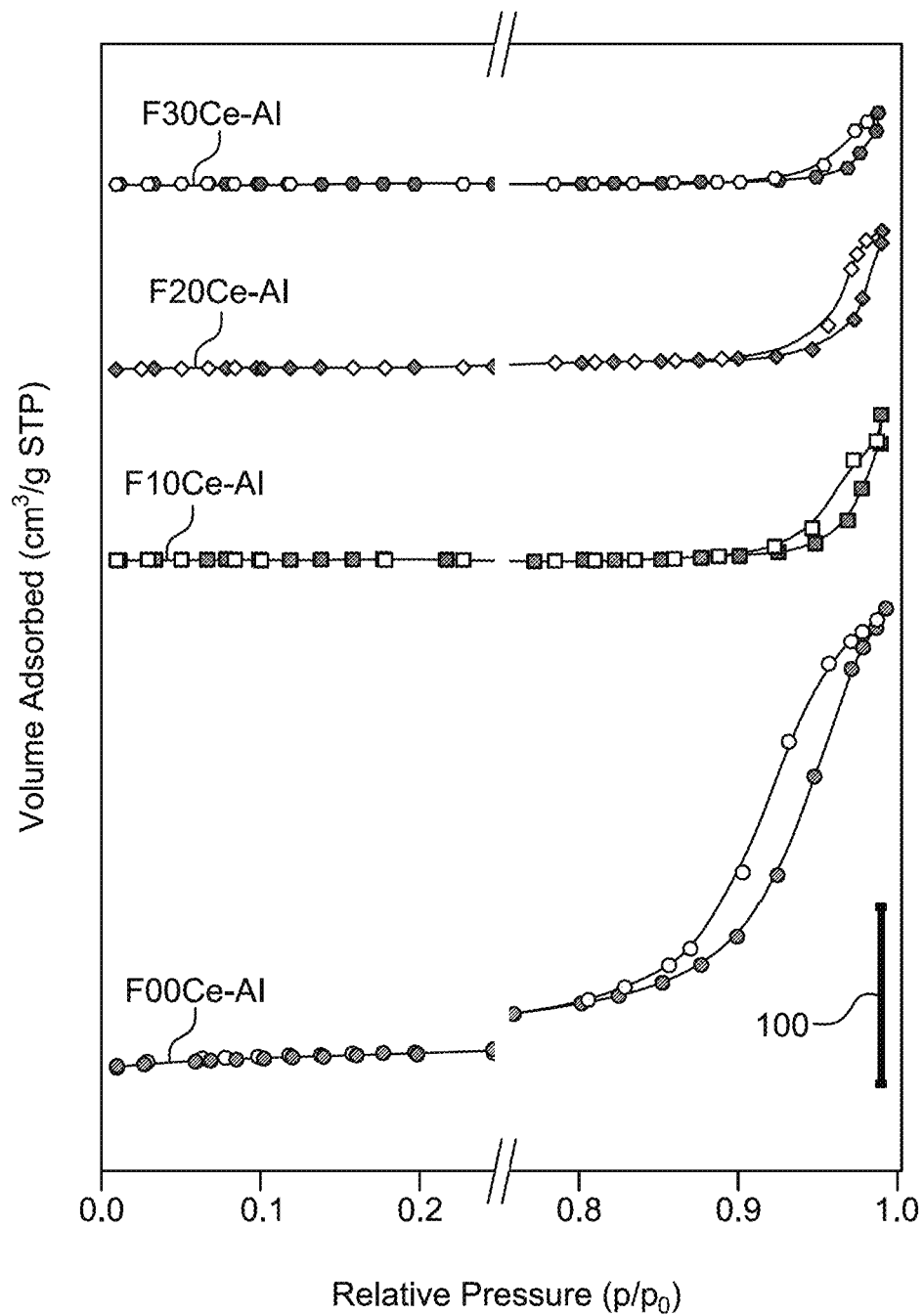
FIG. 4 illustrates nitrogen adsorption-desorption isotherms for fresh Fe—Ce—Al oxygen carrier samples, according to certain embodiments.

Nitrogen adsorption and desorption isotherms of the oxygen carriers were classified as type IV with H3 hysteresis loops. This indicates that nitrogen undergoes capillary condensation within the mesoporous structure of the material, typically characterized by pore sizes in the range of 2 to 50 nanometers [Pudukudy, M. et al., One-pot sol-gel synthesis of MgO nanoparticles supported nickel and iron catalysts for undiluted methane decomposition into COx free hydrogen and nanocarbon, *Appl Catal B*, 2017, 218, 298-316, which is incorporated herein by reference in its entirety]. Isotherms corresponding to the fresh oxygen carrier are presented in FIG. 4, which illustrates the $N_2$ adsorption-desorption behavior of the material.

67.9° were identified as corresponding to the $Al_2O_3$ support, as referenced by JCPDS card number 00-004-0875. Additional peaks at 2θ values of 23.85°, 33.2°, 35.65°, 40.80°, 54.05°, 62.45°, and 63.95° were assigned to hematite ($Fe_2O_3$), consistent with JCPDS card number 33-0664. The diffractogram associated with $CeO_2$ exhibited peaks at 2θ values of 28.5°, 47.6°, and 56.4°, as indexed by JCPDS card number 78-0694.

Diffraction peaks corresponding to $CeO_2$, $Al_2O_3$, and $Fe_2O_3$ were observed in all oxygen carrier samples. A decrease in peak intensity for $CeO_2$ and $Al_2O_3$ was observed upon incorporation of iron, which is attributed to surface dispersion of iron particles on the support material, thereby attenuating the intensity of the underlying crystalline phases.

Additionally, a diffraction peak appearing at 2θ=76.0° was assigned to iron aluminate ($FeAl_2O_4$), in accordance with JCPDS card number 01-089-1694. Formation of $FeAl_2O_4$ is attributed to a solid-state reaction occurring during calcination, where aluminum oxide reacts with iron oxide under thermal treatment, leading to the generation of a spinel-type Fe-aluminate phase during oxygen carrier synthesis.

A degree of crystallinity of the oxygen carriers was assessed by analyzing X-ray diffraction (XRD) patterns. The crystallinity was calculated as the ratio of the crystalline peak area to the total area under the XRD curve. Based on the analysis, the oxygen carrier designated as F10Ce—Al exhibited a degree of crystallinity of 62.85%, F20Ce—Al exhibited 64.34%, and F30Ce—Al exhibited 68.34%. Increasing the iron (Fe) content led to a corresponding increase in crystallinity. Higher crystallinity in oxygen carriers has been associated with improved cycle performance (i.e., structures are capable of maintaining consistent conversion rates over multiple reaction cycles due to enhanced structural stability) [Tong, D.-G. et al., Effect of crystallinity on the catalytic performance of amorphous Co—B particles prepared from cobalt nitrate and potassium borohydride in the cinnamaldehyde hydrogenation, *J Mol Catal A Chem*, 2007, 265, 1-2, 195-204, which is incorporated herein by reference in its entirety].

The ability of the oxygen carrier to undergo reduction and oxidation is a factor in the chemical looping process that influences both the availability and accessibility of lattice oxygen during redox reactions. Temperature-programmed reduction (TPR) and temperature-programmed oxidation (TPO) techniques were employed to evaluate these proper-

TABLE 2

Textural properties of fresh and spent Fe—Ce—Al oxygen carrier

| | Fresh oxygen carrier | | | | Spent oxygen carrier (after 5 cycles, after steam reactor at 650° C.) | | | |
| --- | --- | --- | --- | --- | --- | --- | --- | --- |
| Oxygen carrier | BET ($m^2/g$) | Pore volume ($cm^3/g$) | Pore diameter (nm) | Metal crystallite size (nm) | BET ($m^2/g$) | Pore volume ($cm^3/g$) | Pore diameter (nm) | Metal crystallite size (nm) |
| unmodified $Al_2O_3$ | 71.88 | 0.389 | 21.66 | — | — | — | — | — |
| F00Ce—Al | 65.56 | 0.371 | 22.62 | — | — | — | — | — |
| F10Ce—Al | 10.68 | 0.039 | 15.16 | 15.49 | 12.46 | 0.047 | 14.99 | 18.32 |
| F20Ce—Al | 10.24 | 0.048 | 17.95 | 24.06 | 8.47 | 0.031 | 14.81 | 25.95 |
| F30Ce—Al | 6.09 | 0.017 | 10.94 | 28.95 | 6.76 | 0.026 | 15.73 | 35.06 |

Figure 5:
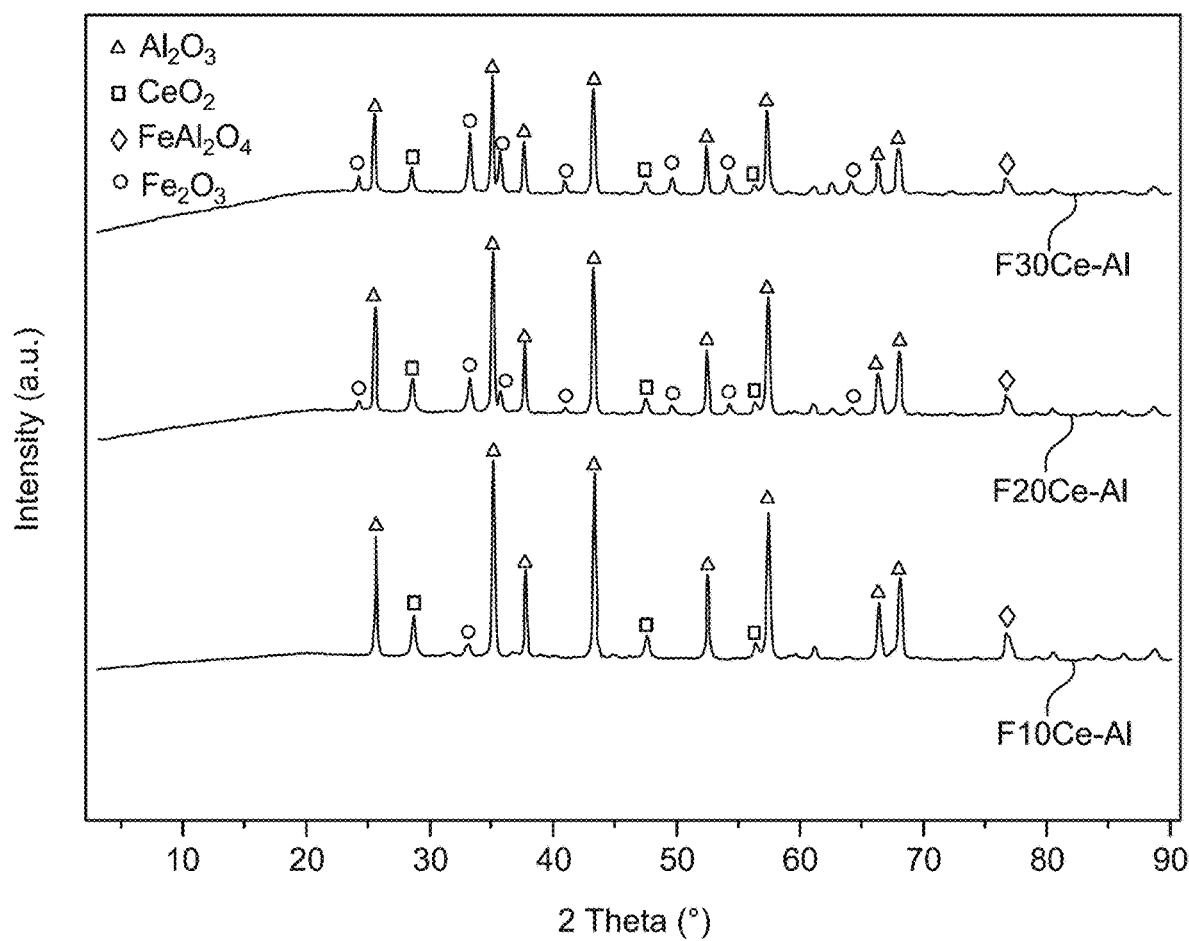
FIG. 5 illustrates X-ray diffraction (XRD) patterns of fresh Fe—Ce—Al oxygen carriers with different Fe loadings, according to certain embodiments.

Phase composition and crystallinity of fresh oxygen carriers was examined using X-ray diffraction (XRD) analysis, as seen in FIG. 5. Characteristic peaks observed at 2° values of 25.5°, 35.05°, 37.65°, 43.2°, 52.35°, 57.3°, 66.2°, and ties. TPR was used to estimate the quantity of reducible species present on the surface of the oxygen carrier and their relevance to catalytic activity. TPO analysis provided information regarding the extent to which the reduced metal species could be re-oxidized, thereby enabling the reusability of the oxygen carrier in its oxide form during successive cycles.

Figure 6:
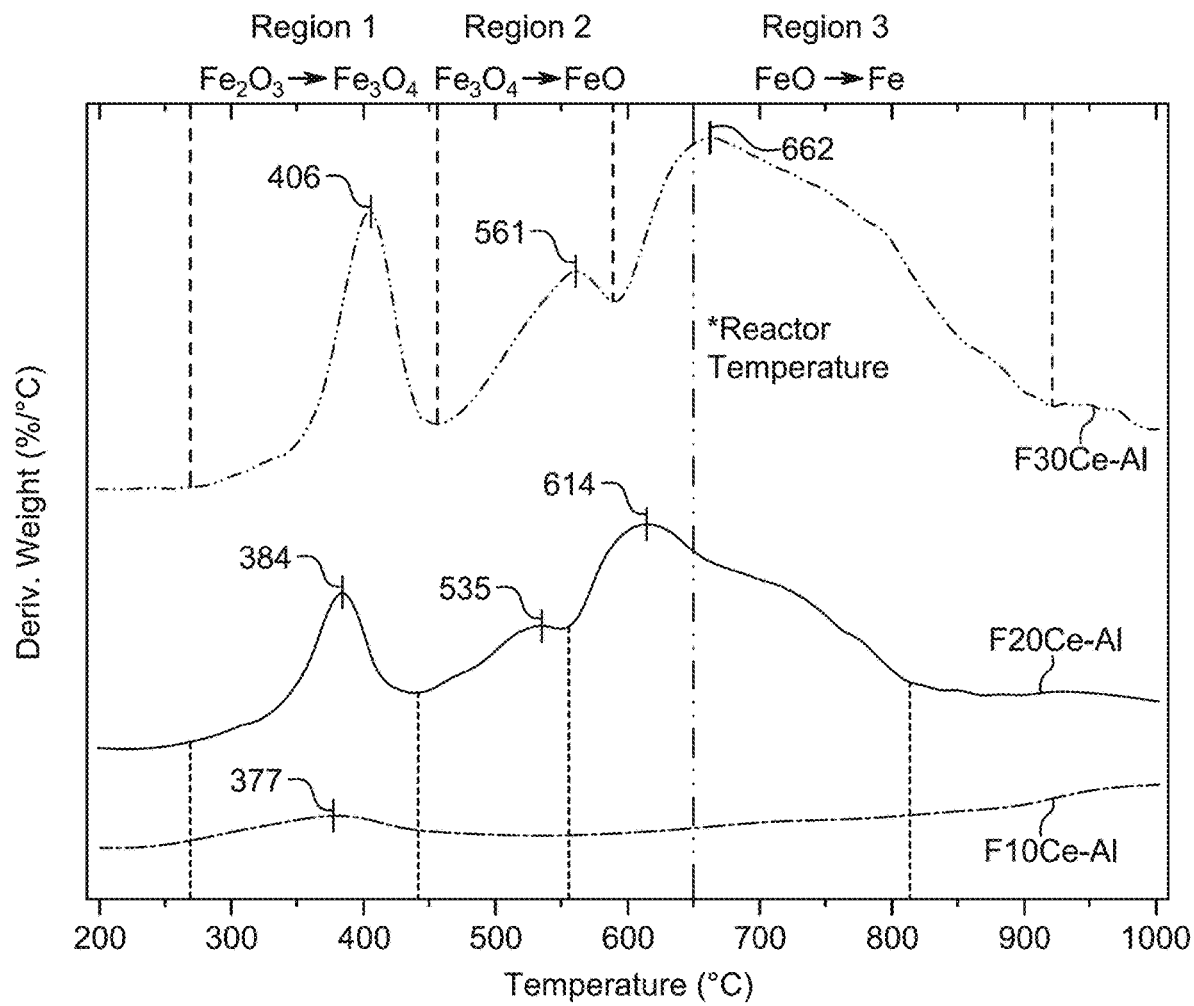
FIG. 6 illustrates temperature-programmed reduction (TPR) profiles of fresh Fe—Ce—Al oxygen carriers, according to certain embodiments.

Temperature-programmed reduction behavior of oxygen carriers was investigated using thermogravimetric analysis (TGA) with hydrogen as the reducing agent. TPR profiles for each oxygen carrier are shown in FIG. 6. Three distinct reduction peaks were observed for all oxygen carriers except F10Ce—Al, which exhibited fewer peaks due to its relatively lower iron oxide content. These profiles reflect the reduction behavior associated with each oxygen carrier.

Reduction signals were observed in three separate temperature regions: 260 to 450° C. (region 1), 450 to 575° C. (region 2), and 575 to 900° C. (region 3). The peak in region 1 corresponds to the reduction of hematite ($Fe_2O_3$) to magnetite ($Fe_3O_4$). The second peak, in region 2, signifies the conversion of $Fe_3O_4$ to wüstite (FeO), while the final peak in region 3 indicates the reduction of FeO to metallic iron (Fe).

In the case of F30Ce—Al, the reduction peak centered at 406° C. indicates that the $Fe_2O_3$ to $Fe_3O_4$ transformation occurred at a lower temperature; however, the subsequent transformation of FeO to Fe occurred in a higher temperature range. The reduction peaks appearing in region 1 were attributed to the reduction of metal oxides with weak interaction with the support material. Peaks in regions 2 and 3 represent metal oxides with moderate and strong interactions with the support, respectively [Al-Fatesh, A. S. et al., Production of hydrogen by catalytic methane decomposition over alumina supported mono-, bi- and tri-metallic catalysts, *Int J Hydrogen Energy*, 2016, 47, 48, 22932-22940, which is incorporated herein by reference in its entirety].

A comparison of the reduction profiles across F10Ce—Al, F20Ce—Al, and F30Ce—Al indicates a shift in peak reduction temperatures with increasing Fe content. In region 1, the $Fe_2O_3$ to $Fe_3O_4$ reduction occurred at 377° C. for F10Ce—Al, 384° C. for F20Ce—Al, and 406° C. for F30Ce—Al. The rise in reduction temperature is attributed to a stronger metal-oxygen bond at higher Fe loading, which increases the energy needed to reduce the oxide. Additionally, a decrease in BET surface area at higher Fe loadings reduces the accessibility of hydrogen to the active sites, as shown in Table 2, further contributing to the increase in reduction temperature.

XRD analysis, as depicted in FIG. 5, revealed that the intensity of the diffraction peak associated with the $FeAl_2O_4$ spinel phase decreased with increasing Fe loading. This trend corresponds with the TPR results, which show a pronounced peak for F10Ce—Al at approximately 1000° C., indicating the formation of spinel species at elevated temperatures. The formation and extent of such spinel phases influences the catalytic performance of the oxygen carrier.

Figure 7:
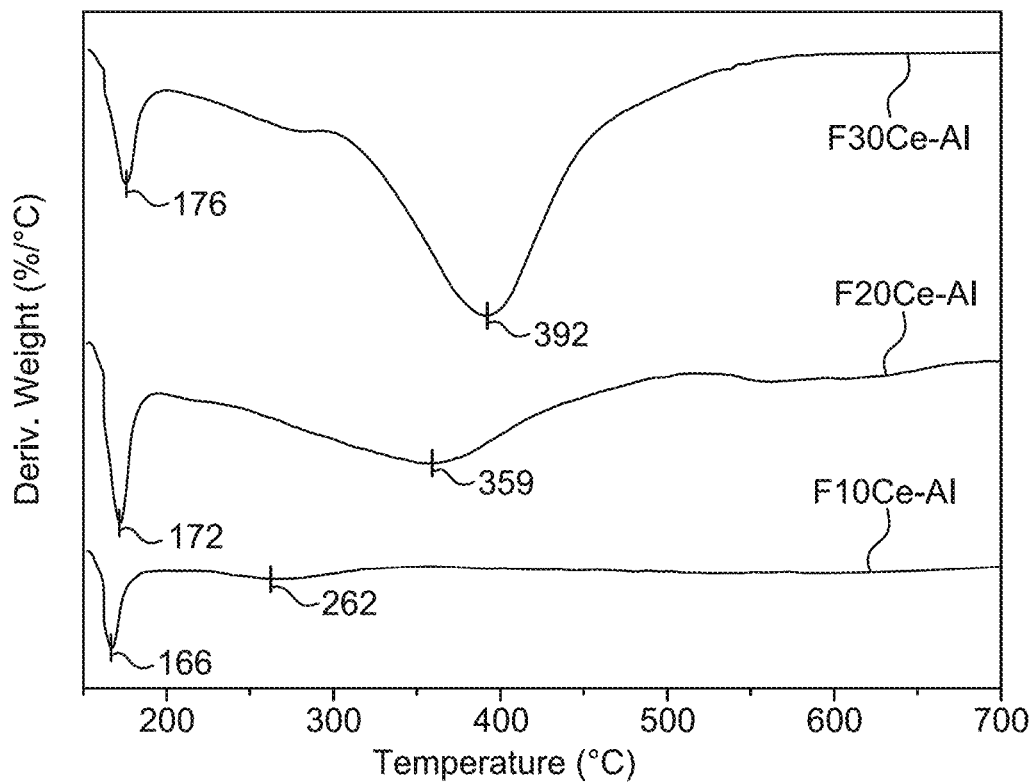
FIG. 7 illustrates temperature-programmed oxidation (TPO) profiles of fresh Fe—Ce—Al oxygen carriers with varying Fe loading, according to certain embodiments.

Temperature-programmed oxidation (TPO) was conducted to assess the reoxidation behavior of reduced oxygen carriers and to determine the temperature range necessary for restoring the metal species to their oxide forms. As shown in FIG. 7, the F10Ce—Al sample, which contains the lowest Fe loading, needed an oxidation temperature of up to 350° C. for complete transformation to hematite. F20Ce—Al and F30Ce—Al needed oxidation temperatures of up to 650° C. A progressive increase in peak oxidation temperature was observed with increasing Fe content, indicating a shift in the reoxidation profile toward higher temperatures as a function of metal loading. Oxygen transport capacity (OTC) of the oxygen carriers was evaluated to quantify the amount of oxygen released or absorbed per gram of carrier material during redox reactions. OTC was calculated by comparing the actual amount of oxygen involved in the reaction with the theoretical oxygen capacity available in the carrier material. The analysis was used for assessing the efficiency of oxygen utilization during the reaction process.

As shown in Table 3, the OTC was found to increase proportionally with higher iron (Fe) loading; however, the efficiency of oxygen release and capture decreased at elevated Fe contents. This reduction in efficiency is attributed to the diminished contact between the reactive sites of the oxygen carrier and the gaseous reactants (e.g., $H_2$ or air), which results from the lower surface area and pore volume observed at higher Fe loadings, as detailed in Table 2. The ability of an oxygen carrier to sustain high oxygen transport capacity with structural and chemical stability contributes to reducing solid circulation rates and enhancing the overall techno-economic feasibility of chemical looping processes [Cui, D. et al., A high-performance oxygen carrier with high oxygen transport capacity and redox stability for chemical looping combustion, *Energy Convers Manag*, 2019, 202, 112209, which is incorporated herein by reference in its entirety].

Figure 8:
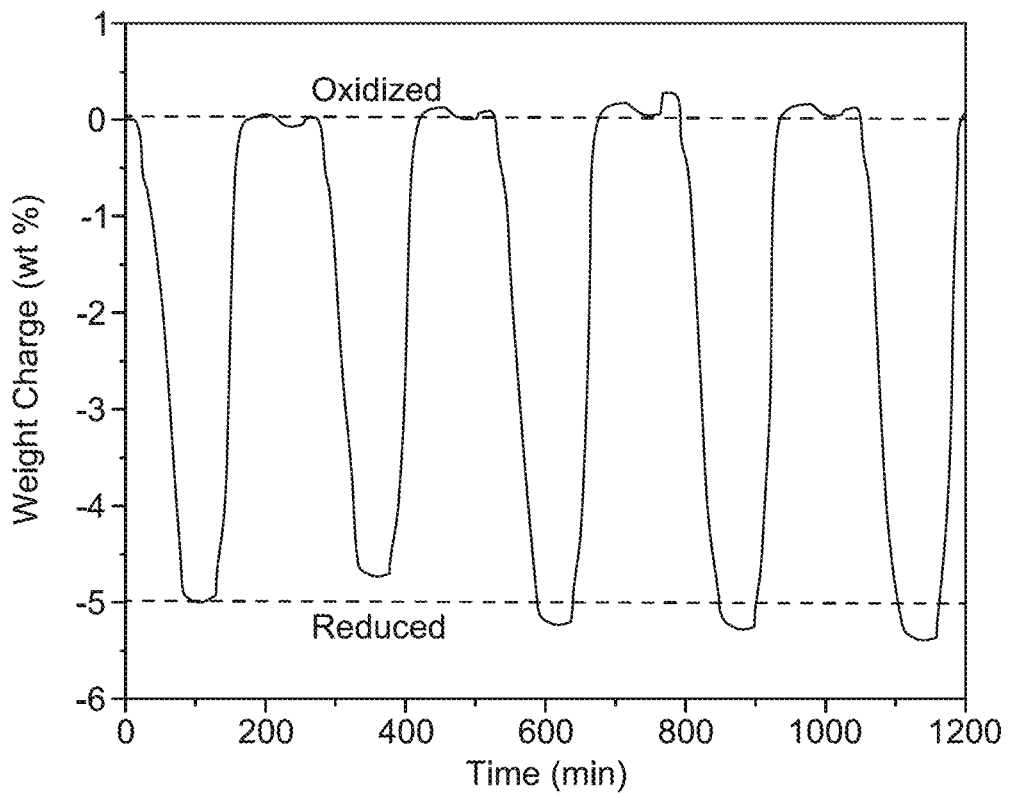
FIG. 8 illustrates effects of cyclical reduction and oxidation on weight of F30Ce—Al oxygen carrier, according to certain embodiments.

The stability of the oxygen carrier under repeated redox conditions is a performance criterion due to the high-temperature cyclic oxidation and reduction environments inherent to chemical looping systems. To assess this property, the effect of repeated redox cycling on the weight retention of the F30Ce—Al oxygen carrier was studied. Test results, illustrated in FIG. 8, show the percentage change in carrier mass relative to its initial weight, as measured using thermogravimetric analysis (TGA).

F30Ce—Al demonstrated stable behavior over successive cycles, with only a slight, gradual decrease in mass observed. The decrease is attributed to sintering of the carrier material, which impedes oxygen diffusion and transport during redox operation, leading to a reduction in effective oxygen carrier mass. These findings are consistent with earlier studies, which have reported similar mass losses of approximately 6% in Al—Fe—Mn—Cu-based oxygen carriers under comparable redox cycling conditions due to sintering effects [Tippey, K. et al., In-situ analysis of the Al—Fe—Mn—Cu oxide oxygen carrier for chemical looping applications, *Chemical Engineering Journal Advances*, 2022, 9, 1000203, which is incorporated herein by reference in its entirety].

TABLE 3

Oxygen transport capacity of Fe—Ce—Al oxygen carrier

| Oxygen Carrier | Theoretical OTC (mmol/gr) | OTC based on TPR | | OTC based On TPO | |
|---|---|---|---|---|---|
| | | Actual (mmol/gr) | Released Efficiency (%) | Actual (mmol/gr) | Captured Efficiency (%) |
| F10Ce—Al | 1.336 | 0.813 | 60.85 | 0.893 | 66.84 |
| F20Ce—Al | 2.786 | 2.057 | 73.83 | 2.380 | 85.43 |
| F30Ce—Al | 4.307 | 2.647 | 61.46 | 2.836 | 65.85 |

Figure 9A:
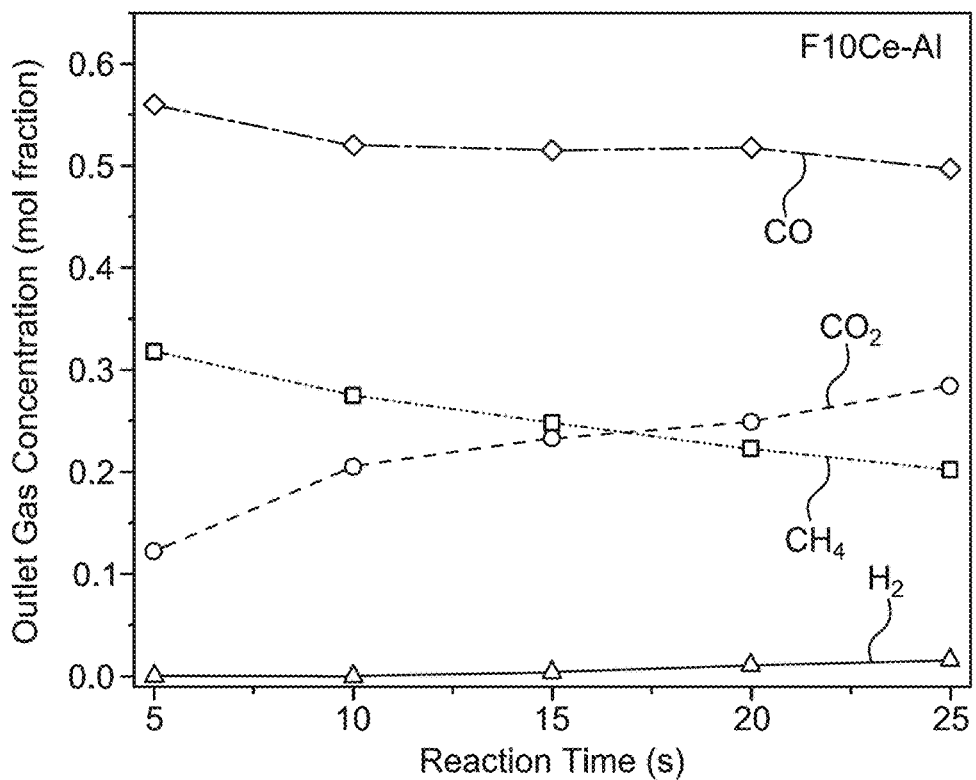
FIG. 9A illustrates an outlet gas composition from fluidized CREC Riser Simulator using F10Ce—Al oxygen carrier during methane reduction, according to certain embodiments.
Figure 9B:
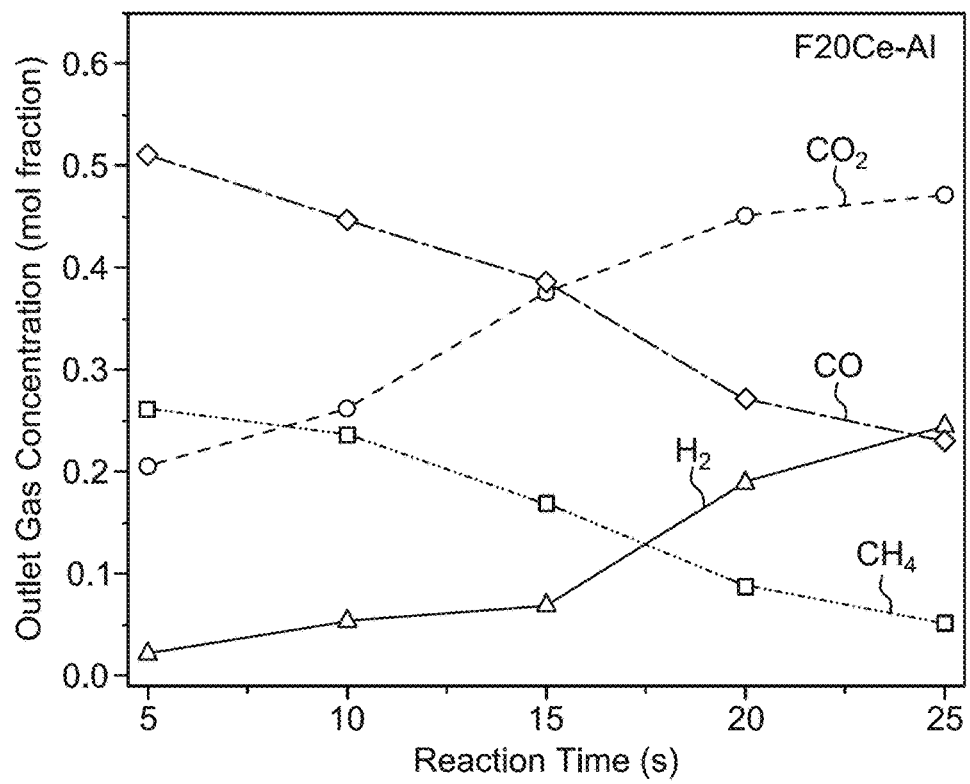
FIG. 9B illustrates an outlet gas composition from fluidized CREC Riser Simulator using F20Ce—Al oxygen carrier during methane reduction, according to certain embodiments.
Figure 9C:
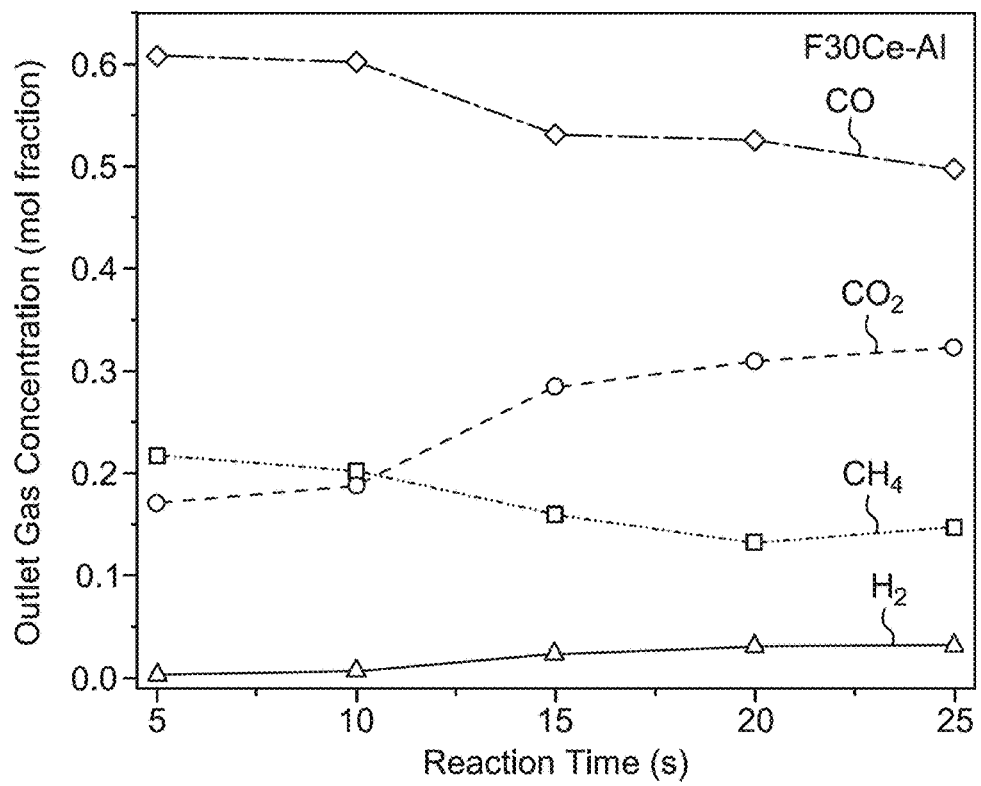
FIG. 9C illustrates an outlet gas composition from fluidized CREC Riser Simulator using F30Ce—Al oxygen carrier during methane reduction, according to certain embodiments.

Catalytic performance of the oxygen carriers within the fuel reactor was assessed based on outlet gas concentration profiles, as presented in FIGS. 9A-9C. Across oxygen carrier compositions, a consistent trend was observed where concentrations of methane ($CH_4$) and carbon monoxide (CO) declined over the course of the reaction, while concentrations of carbon dioxide ($CO_2$) and hydrogen ($H_2$) increased steadily until the reaction reached 25 seconds.

These observations are attributed to oxidation reactions where methane reacts with oxygen released from iron oxide, as represented by reactions (3), (4), and (5) in Table 4. The observed reduction in CO concentration, which arises as an intermediate product in reactions (4) and (5), is further explained by the occurrence of the water-gas shift reaction (WGSR), represented by reaction (6) in Table 4.

TABLE 4

Main reaction in chemical looping for hydrogen production

| Reactor | Main reaction taking place | |
|---|---|---|
| Fuel Reactor | $12Fe_2O_3 + CH_4 \rightarrow 8Fe_3O_4 + CO_2 + 2H_2O$ | (3) |
| | $Fe_3O_4 + CH_4 \rightarrow 3FeO + CO + 2H_2$ | (4) |
| | $FeO + CH_4 \rightarrow Fe + CO + 2H_2$ | (5) |
| | $CO + H_2O \rightarrow CO_2 + H_2$ | (6) |
| | $3Fe_2O_3 + H_2 \rightarrow 2Fe_3O_4 + H_2O$ | (7) |
| | $Fe_3O_4 + H_2 \rightarrow 3FeO + H_2O$ | (8) |
| | $FeO + H_2 \rightarrow Fe + H_2O$ | (9) |
| Steam Reactor | $Fe + H_2O \rightarrow FeO + H_2$ | (10) |
| | $3FeO + H_2O \rightarrow Fe_3O_4 + H_2$ | (11) |
| Air Reactor | $6FeO + O_2 \rightarrow 2Fe_3O_4$ | (12) |
| | $4Fe_3O_4 + O_2 \rightarrow 6Fe_2O_3$ | (13) |

Figure 10:
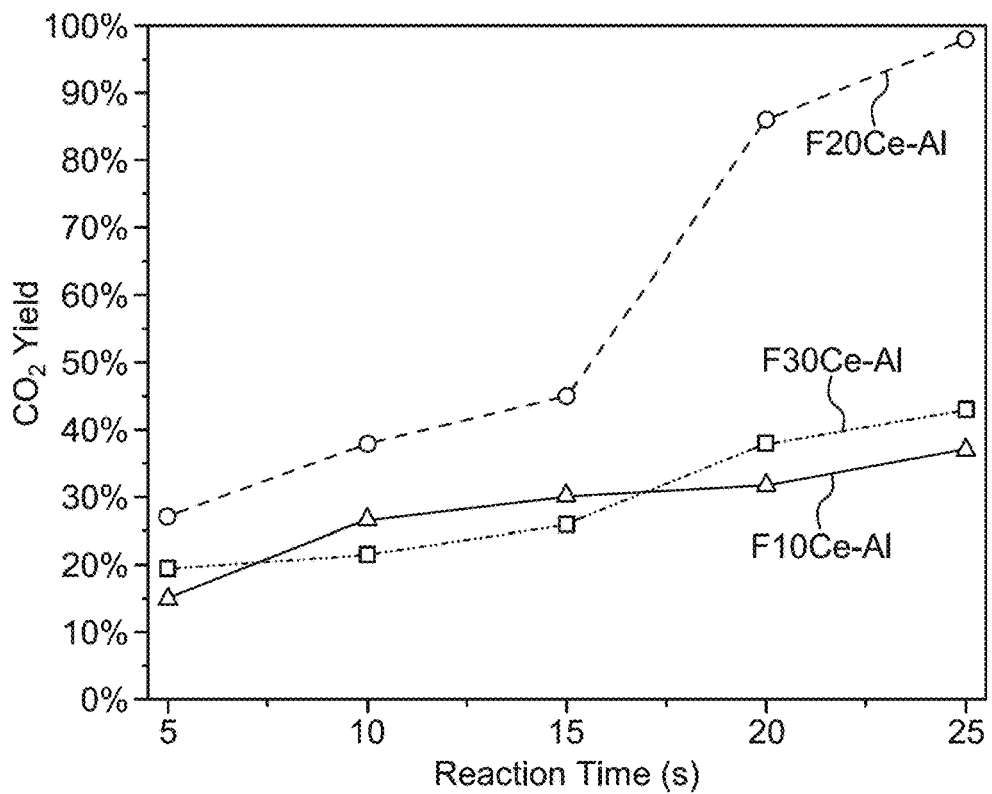
FIG. 10 illustrates $CO_2$ yield as a function of reaction time during methane reduction using Fe—Ce—Al oxygen carriers at 650° C., according to certain embodiments.

The performance of F20Ce—Al within the fuel reactor was found to be superior in terms of product selectivity when compared to the other oxygen carriers. As shown in FIGS. 9A-9C, F20Ce—Al exhibited a marked decrease in carbon monoxide (CO) concentration and a corresponding increase in hydrogen and carbon dioxide concentrations. These observations were further supported by FIG. 10, which presents a graphical correlation between reaction time and $CO_2$ yield. F20Ce—Al generated a higher yield of $CO_2$ than the other oxygen carrier formulations.

Figure 11:
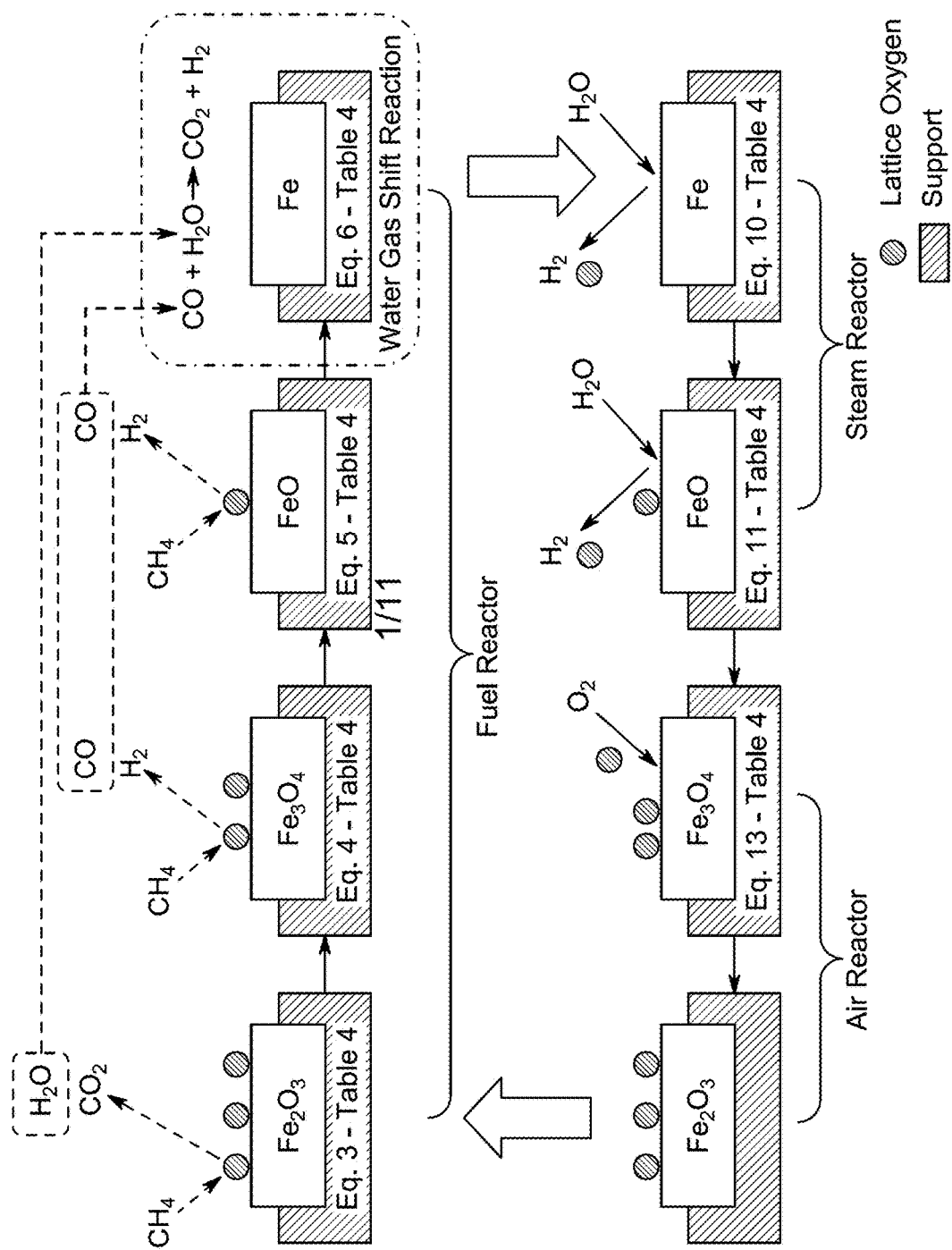
FIG. 11 illustrates a schematic diagram representing an overall catalytic reaction mechanism for hydrogen production from methane using chemical looping, according to certain embodiments.

The observed behavior was attributed to the high catalytic activity of metallic iron (Fe) in facilitating the water-gas shift reaction (WGSR), as represented by reaction (6) in Table 4, particularly under the fuel reactor operating temperature of 650° C. Iron is recognized as an effective catalyst for WGSR in the temperature range of 400 to 800° C. [Ebrahimi, P. et al., A review of recent advances in water-gas shift catalysis for hydrogen production, *Emergent Mater,* 2020, 3, 6, 881-917, which is incorporated herein by reference in its entirety]. A schematic representation of reaction mechanisms occurring within the fuel reactor is provided in FIG. 11, offering a comprehensive overview of underlying processes.

Figure 12:
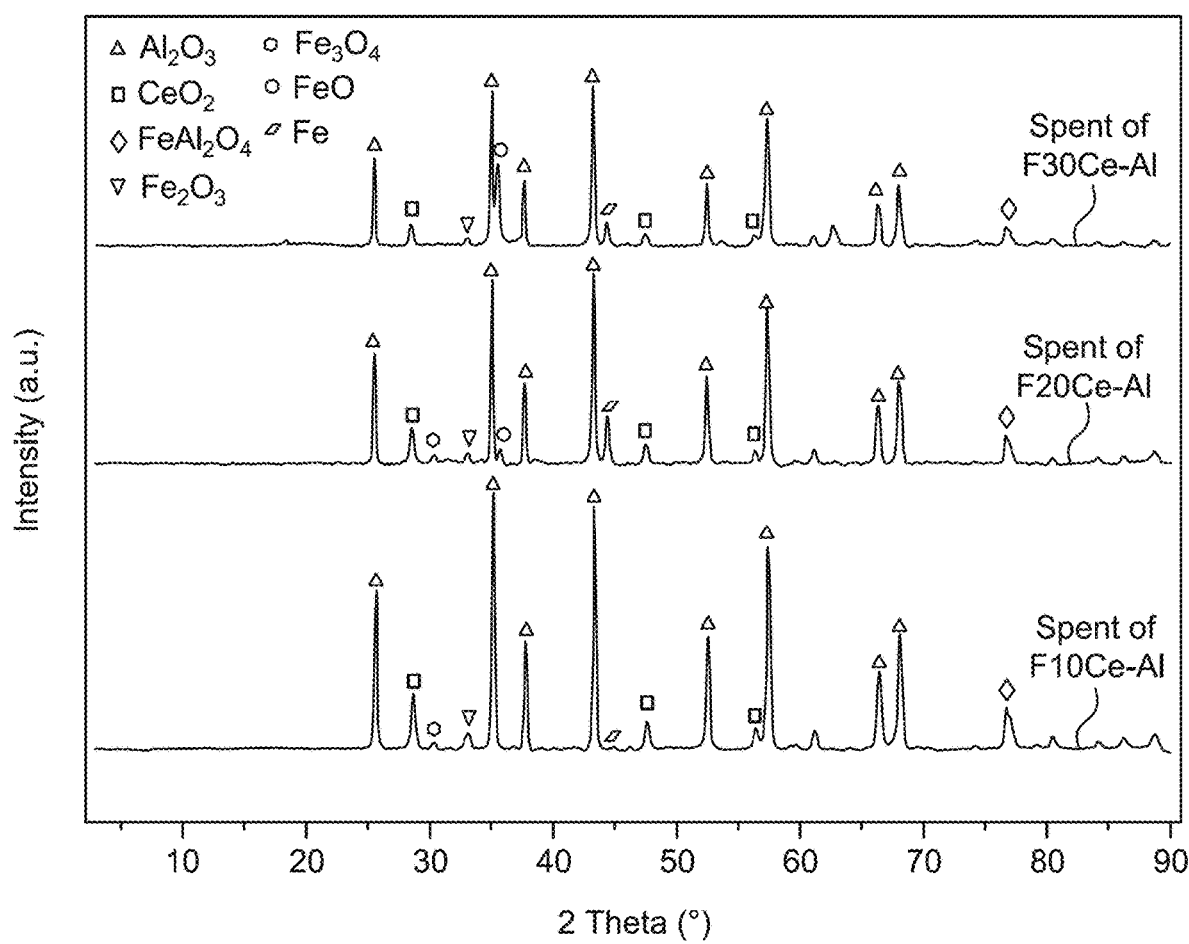
FIG. 12 illustrates XRD patterns for spent oxygen carriers after $CH_4$ reduction in a fuel reactor, according to certain embodiments.

X-ray diffraction (XRD) analysis of the spent oxygen carrier following methane injection revealed a higher intensity peak at 2θ=44.6°, corresponding to the Fe metal phase (JCPDS 65-4899), in F20Ce—Al, as illustrated in FIG. 12. This indicates a higher degree of reduction to elemental iron compared to other oxygen carriers. The obtained results are consistent with temperature-programmed reduction (TPR) data presented in FIG. 6, where F20Ce—Al passed through the peak in region 3 at 650° C., confirming the conversion of the oxygen carrier predominantly to Fe under reaction conditions.

TPR results for F30Ce—Al indicates that the oxygen carrier predominantly remains in the FeO phase. This is corroborated by XRD data showing a stronger intensity peak at 2θ=35.9°, assigned to FeO (JCPDS 89-0687), rather than to metallic Fe. The greater abundance of elemental Fe in F20Ce—Al is consistent with the enhanced conversion of methane and higher production of $H_2$ and $CO_2$.

Figure 13:
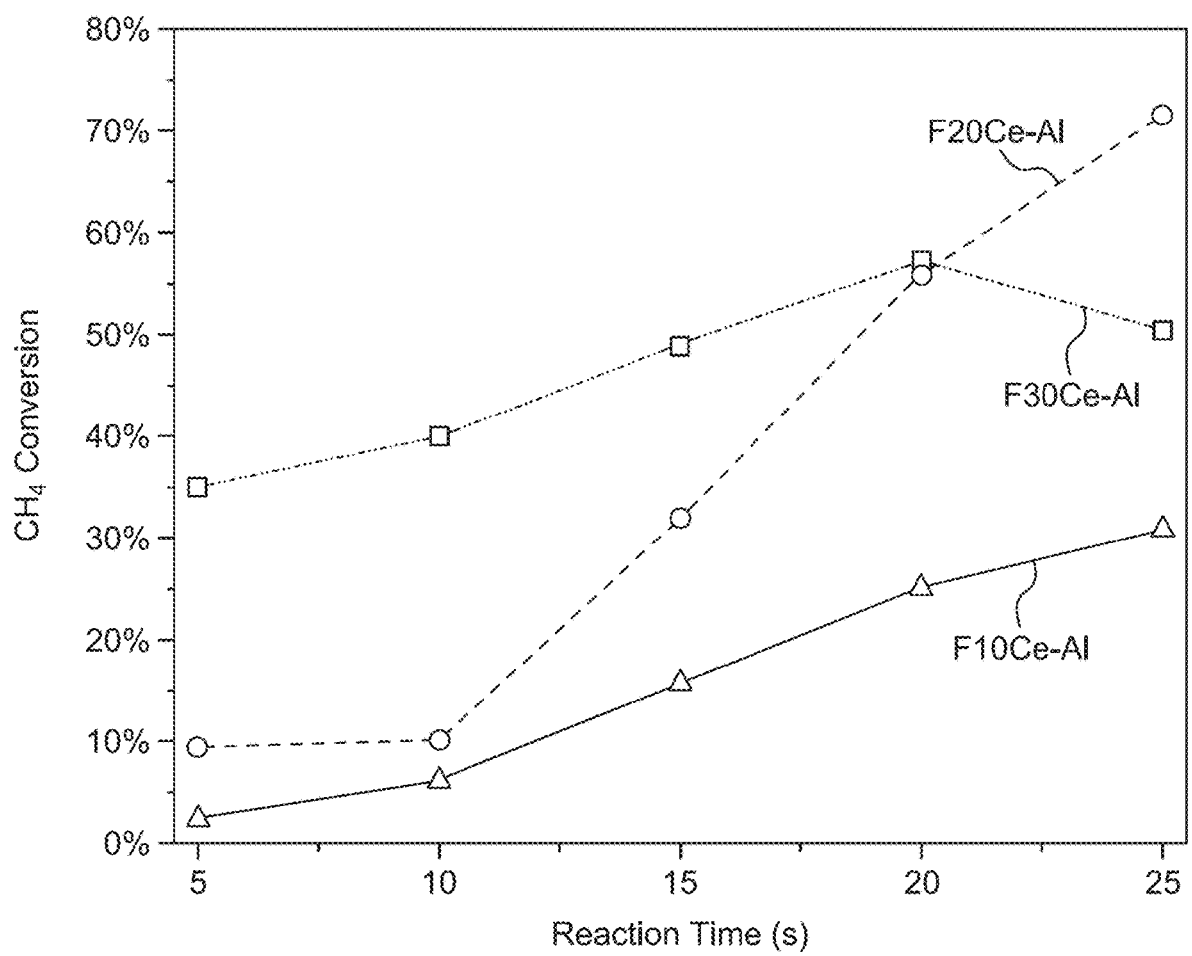
FIG. 13 illustrates methane conversion as a function of reaction time during $CH_4$ reduction in a fuel reactor using different Fe—Ce—Al oxygen carriers, according to certain embodiments.
Figure 14A:
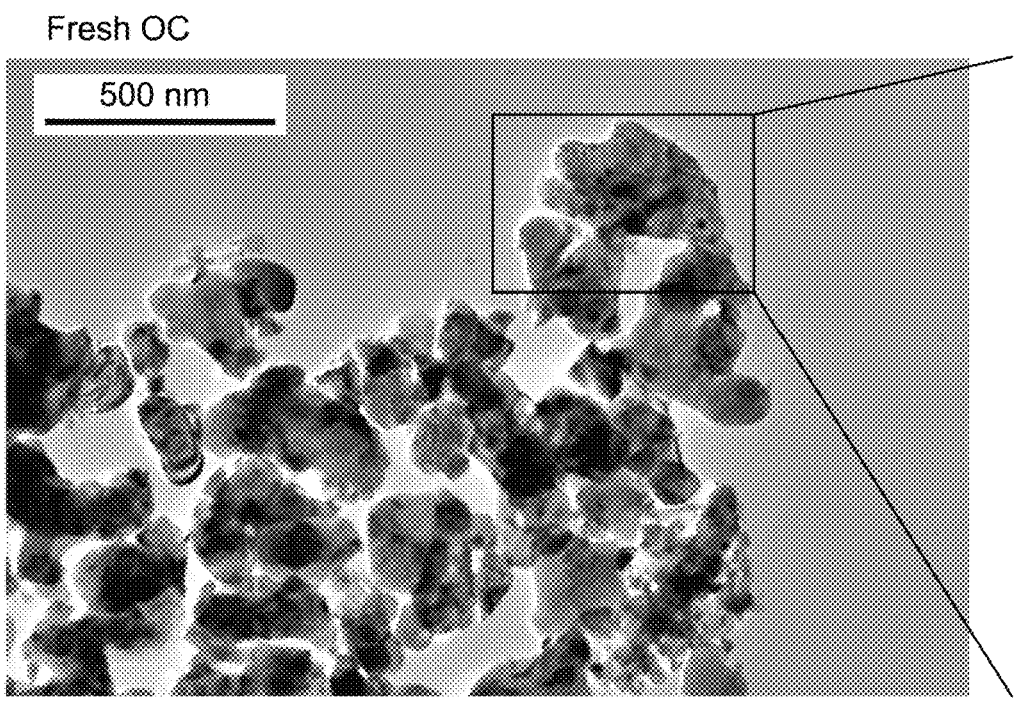
FIG. 14A illustrates a high-resolution transmission electron microscopy (HR-TEM) image of fresh F30Ce—Al oxygen carrier with a scale of 500 nm, according to certain embodiments.
Figure 14B:
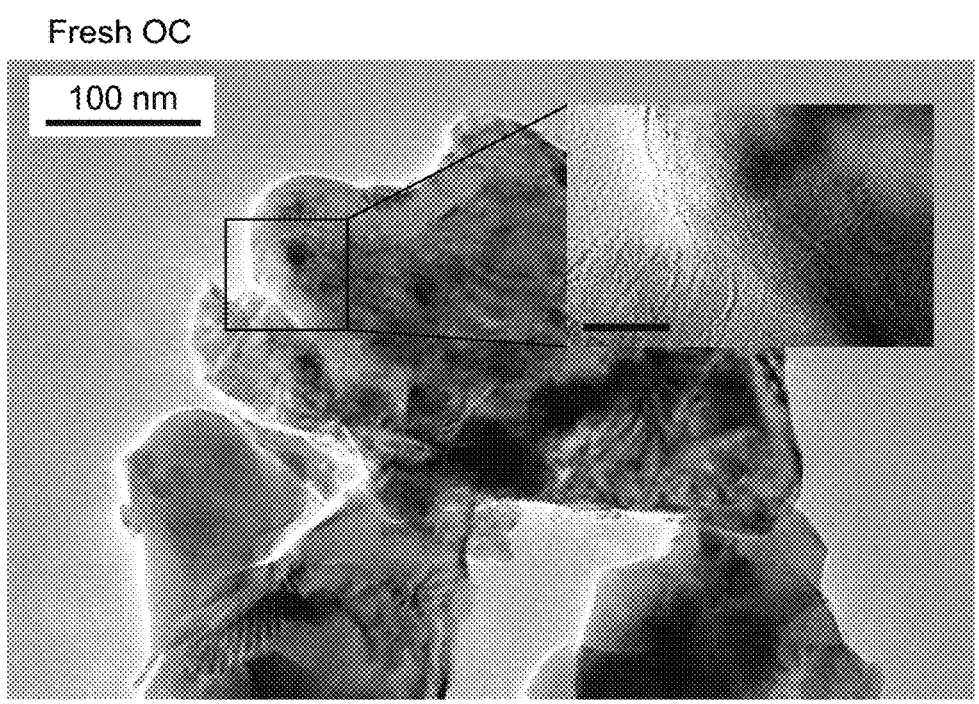
FIG. 14B illustrates an HR-TEM image of fresh F30Ce—Al oxygen carrier with a scale of 100 nm, according to certain embodiments.
Figure 14C:
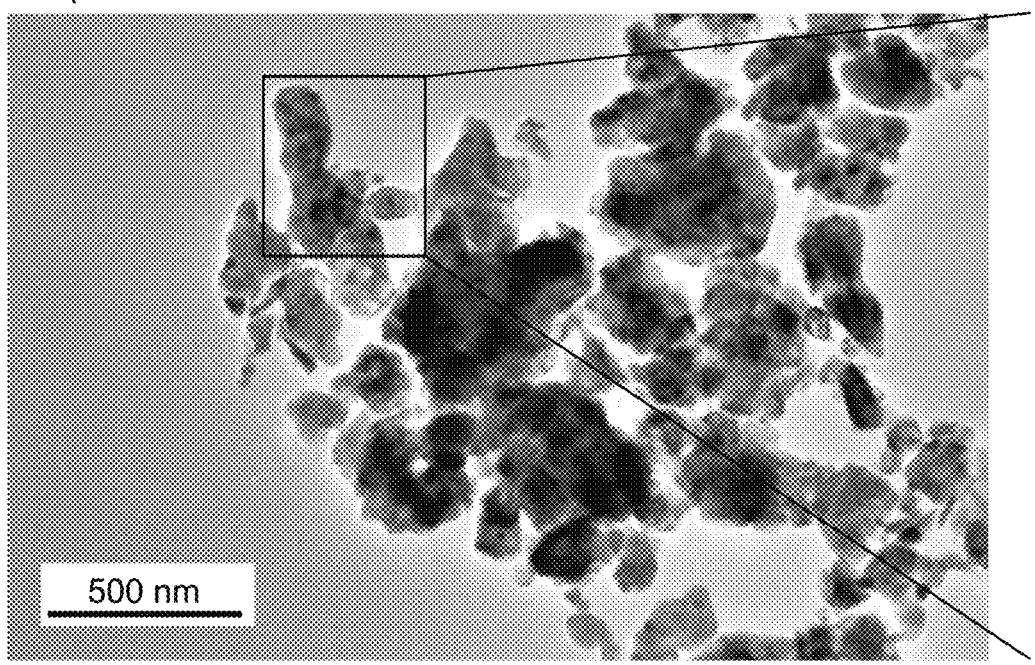
FIG. 14C illustrates an HR-TEM image of spent F30Ce—Al oxygen carrier with a scale of 500 nm, according to certain embodiments.
Figure 14D:
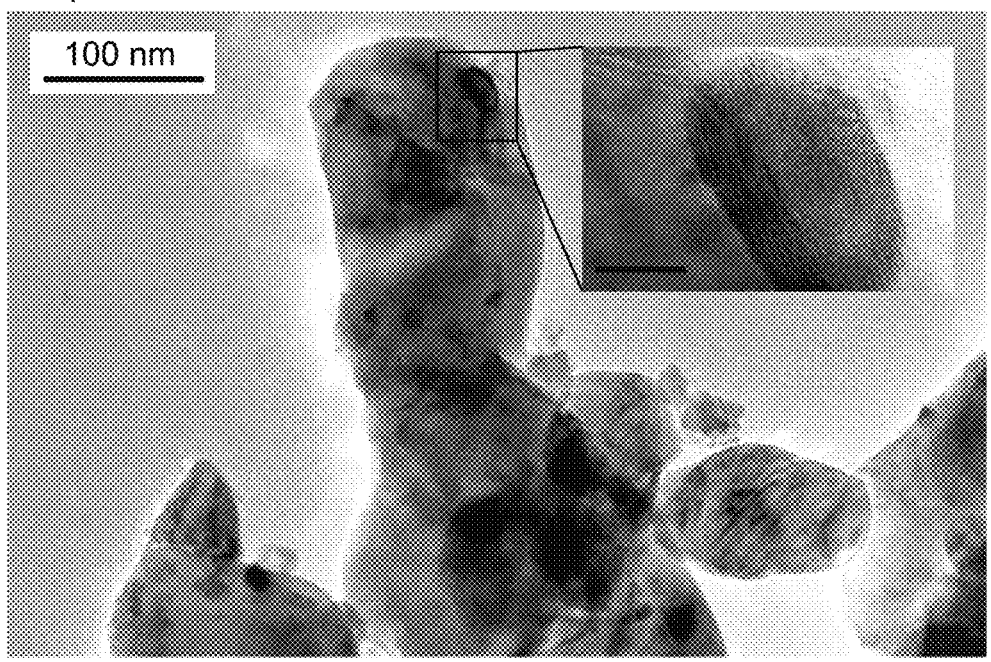
FIG. 14D illustrates an HR-TEM image of spent F30Ce—Al oxygen carrier with a scale of 100 nm, according to certain embodiments.

To evaluate the effect of residence time on methane conversion, reaction time variation experiments were conducted. As shown in FIG. 13, all oxygen carriers exhibited an increase in methane conversion as reaction time increased, with a change occurring after 10 seconds. FIG. 13 demonstrates that increasing Fe content in the oxygen carrier correlates with an increase in $CH_4$ conversion; however, at the 25-second mark, F30Ce—Al showed a decline in methane conversion, while F10Ce—Al and F20Ce—Al continued to exhibit increasing trends. The decline in $CH_4$ conversion after 20 seconds for F30Ce—Al is attributed to agglomeration effects at high Fe loading. As indicated in Table 2, the crystallite size of metallic particles in F30Ce—Al increased from 28.95 nm to 35.06 nm, indicating the onset of agglomeration during the reaction process.

To further investigate the onset of agglomeration, high-resolution transmission electron microscopy (HR-TEM) was conducted to evaluate Fe particle size distributions in both fresh and spent samples. FIGS. 14A-14D display HR-TEM micrographs, with a d-spacing of 0.203 nm corresponding to the (110) crystal plane of elemental Fe [Loedolff, M. J. et al., Solution-phase decomposition of ferrocene into wustite-iron oxide core-shell nanoparticles, *Dalton Transactions,* 2022, 51, 4, 1603-1611, which is incorporated herein by reference in its entirety]. Analysis of the HR-TEM images revealed that Fe particle sizes ranged from 28 to 30 nm in fresh samples and increased to 115 to 190 nm in spent samples, indicating particle growth and agglomeration in F30Ce—Al during reaction. The agglomeration effect contributes to the decline in methane conversion after the 20 second mark.

An experimental investigation was conducted to evaluate the effect of temperature variation on methane conversion. The experiment was performed over a range of operating temperatures from 500 to 650° C. using F20Ce—Al as the oxygen carrier and employing a reaction time of 20 seconds. The selected temperature range was determined based on the maximum allowable operating temperature of the bench-scale reactor system.

Figure 15:
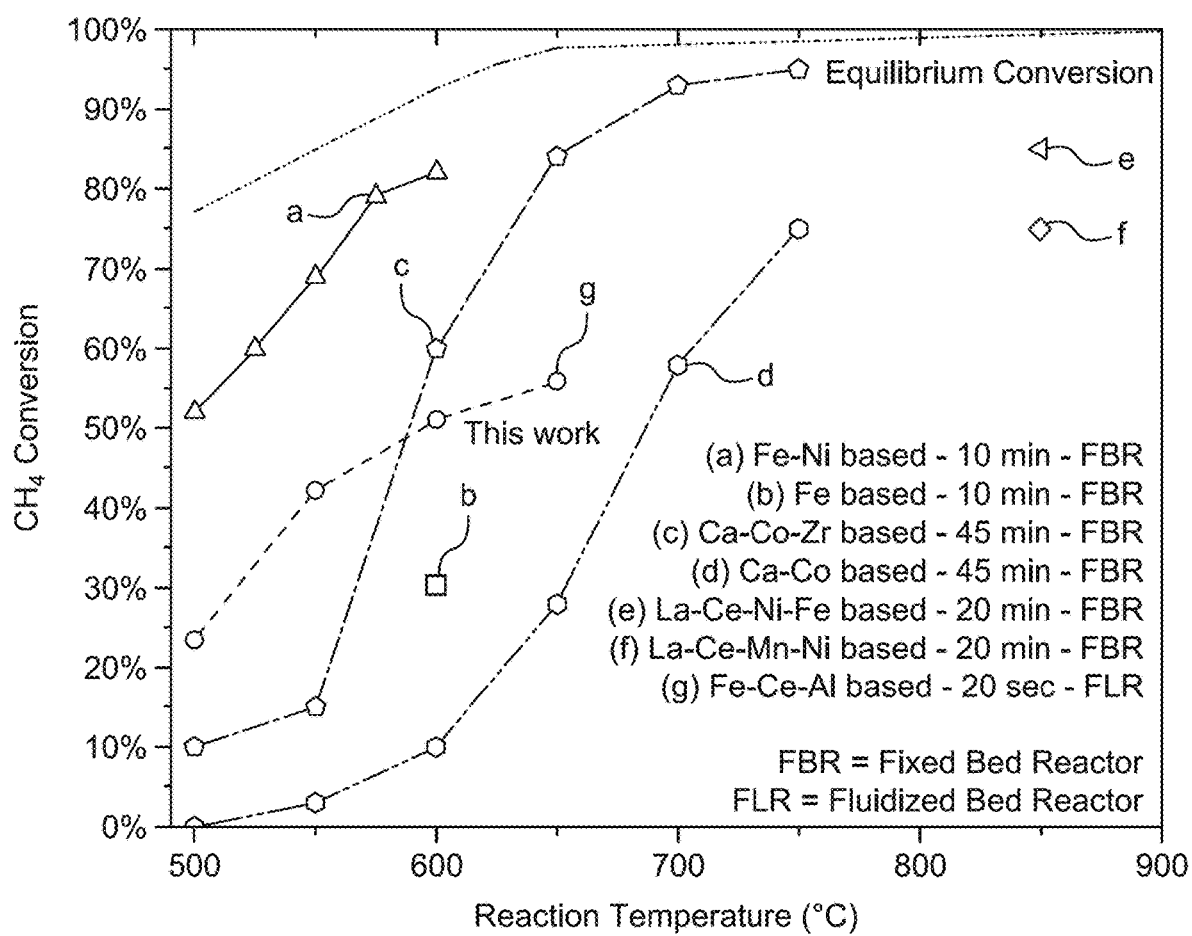
FIG. 15 illustrates methane conversion as a function of temperature using F20Ce—Al oxygen carrier in a fuel reactor with temperatures of 500 to 650° C., according to certain embodiments.

The resulting data are presented in FIG. 15, which illustrates the relationship between operating temperature and $CH_4$ conversion. At 500° C., $CH_4$ conversion was observed to be relatively low but increased progressively with higher operating temperatures. A maximum $CH_4$ conversion rate of 55% was achieved at 650° C. To supplement the experimental data, equilibrium conversion values were simulated using Aspen Plus software. The simulation results indicated that near-complete $CH_4$ conversion (approximately 100%) may be achieved at operating temperatures exceeding 850° C. The simulation results agree with previous findings, which show that thermodynamic equilibrium permits full $CH_4$ conversion within the temperature range of 850 to 900° C. [Li, F. et al., Syngas chemical looping gasification process: Oxygen carrier particle selection and performance, *Energy & Fuels,* 2009, 23, 8, 4182-4189, which is incorporated herein by reference in its entirety].

FIG. 15 provides a comparative analysis of methane conversion performance for different oxygen carriers. Previous research evaluated the influence of incorporating both nickel and iron into a single oxygen carrier system [Li, Y., Mid-temperature chemical looping methane reforming for hydrogen production via iron-based oxygen carrier particles, *Fuel Processing Technology*, 2024, 253, 108026, which is incorporated herein by reference in its entirety]. Addition of nickel enhanced $CH_4$ conversion by promoting a steam methane reforming pathway, which was shown to be more effective than systems containing only iron. Results of nickel-enhanced performance are illustrated in FIG. 15. Modification of oxygen carriers by incorporating calcium oxide for hydrogen purification via $CO_2$ removal was also examined. Addition of zirconium (Zr) as a promoter to oxygen carriers including calcium oxide was evaluated for the prevention of deactivation caused by carbon deposition. Incorporation of the Zr promoter resulted in an improvement in $CH_4$ conversion [Akbari-Emadabadi, S. et al., Production of hydrogen-rich syngas using Zr modified Ca—Co bifunctional catalyst-sorbent in chemical looping steam methane reforming, *Appl Energy*, 2017, 206, 51-62, which is incorporated herein by reference in its entirety].

The Fe—Ce—Al-based catalyst synthesized in the present disclosure demonstrated high $CH_4$ conversion capabilities, as evidenced by the conversion obtained within 20 seconds of operation in a fluidized bed reactor. The findings from the present system contribute to the ongoing development of high-performance oxygen carriers for $CH_4$ conversion applications.

Hydrogen production through chemical looping includes multiple sequential stages, as shown in FIG. 2, among which the steam reactor is needed. In this configuration, iron(III) oxide serves as the oxygen carrier and reacts with methane in the fuel reactor, resulting in the reduction of iron(III) oxide to metallic iron (Fe). The reduced Fe then enters the steam reactor, where reaction with water vapor ($H_2O$) generates $H_2$. The stoichiometric reactions are represented by reactions (10) and (11) in Table 4, indicating that 2 moles of Fe yield 2 moles of $H_2$, while 6 moles of FeO yield 2 moles of $H_2$. Complete reduction of $Fe_2O_3$ to Fe is thermodynamically more favorable for maximum $H_2$ production.

Figure 16:
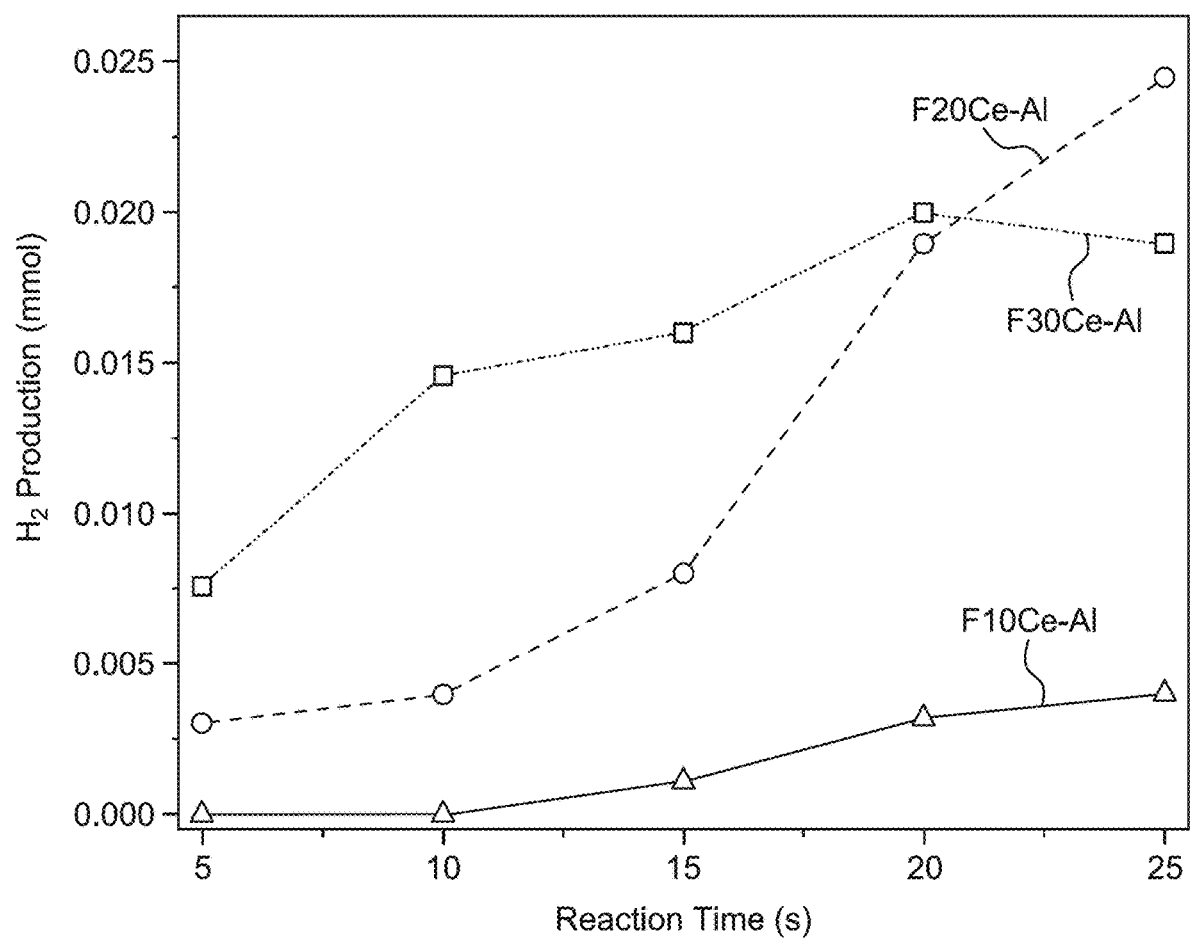
FIG. 16 illustrates hydrogen production as a function of time using Fe—Ce—Al oxygen carriers in a steam reactor at 650° C., according to certain embodiments.

As shown in FIG. 16, increasing Fe loading results in greater $H_2$ generation. X-ray diffraction (XRD) analysis, depicted in FIG. 12, indicated the presence of reactive iron phases. The diffraction peak at $2\theta=44.6°$ (JCPDS 65-4899), associated with elemental Fe, exhibited greater intensity in F20Ce—Al over F30Ce—Al. Conversely, the diffraction peak at $2\theta=35.9°$ (JCPDS 89-0687), associated with FeO, showed stronger intensity in F30Ce—Al over F20Ce—Al. The presence and distribution of Fe and FeO phases contribute to the observed $H_2$ production performance. Between 5 and 20 seconds of reaction time, F30Ce—Al generated a higher amount of $H_2$ compared to F10Ce—Al and F20Ce—Al; however, beyond 25 seconds, a decline in $H_2$ production was observed for F30Ce—Al. This decrease is attributed to agglomeration effects occurring during redox cycling in the fuel reactor, consistent with the reduction in $CH_4$ conversion observed in FIG. 13.

The air reactor serves to function within the chemical looping hydrogen production process by facilitating the regeneration of iron species to iron(III) oxide ($Fe_2O_3$). The regenerated $Fe_2O_3$ phase is subsequently reintroduced into the fuel reactor to sustain cyclic operation. Regeneration is initiated by introducing air into the air reactor at a temperature of 650° C. for a duration of 15 minutes. Selection of this temperature is supported by temperature-programmed oxidation (TPO) data presented in FIG. 7, which indicates complete oxidation of the reduced oxygen carrier phases occurs at 650° C.

Figure 17:
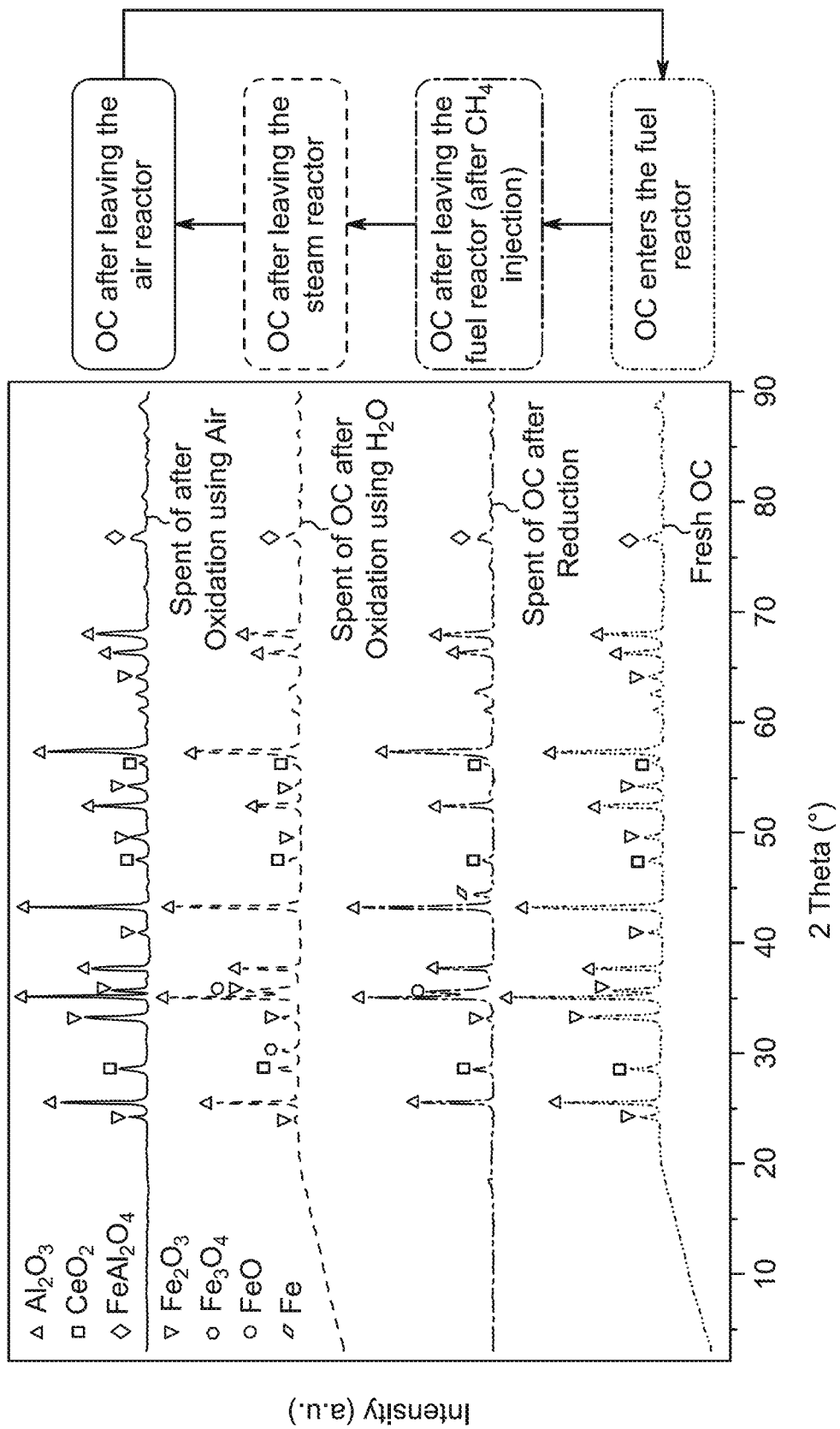
FIG. 17 illustrates XRD patterns of the oxygen carrier at different stages including fresh, post-fuel reactor, post-steam reactor, and post-air reactor, according to certain embodiments.

X-ray diffraction (XRD) analysis results shown in FIG. 17 illustrate phase transitions in the oxygen carrier across stages of the chemical looping process. At the onset, the oxygen carrier in the fresh state contains a large fraction of $Fe_2O_3$, which undergoes reaction with methane ($CH_4$) in the fuel reactor. Following passage through the fuel reactor, XRD analysis of the oxygen carrier reveals a decrease in $Fe_2O_3$ diffraction peaks, with only a minor residual signal detected at $2\theta=33.2°$ (JCPDS 84-0307). At this point, the oxygen carrier primarily consists of metallic Fe and wüstite (FeO), which are reactive toward water vapor ($H_2O$) in the steam reactor to produce hydrogen. After steam injection, the oxygen carrier transitions to a mixture of magnetite ($Fe_3O_4$), FeO, and a minor fraction of $Fe_2O_3$. To fully regenerate the carrier to the $Fe_2O_3$ phase, air is introduced into the air reactor. The resulting oxygen carrier exiting the air reactor was analyzed using XRD, and FIG. 17 confirms that the phase composition matches that of the fresh oxygen carrier, consisting predominantly of $Fe_2O_3$.

Figure 18:
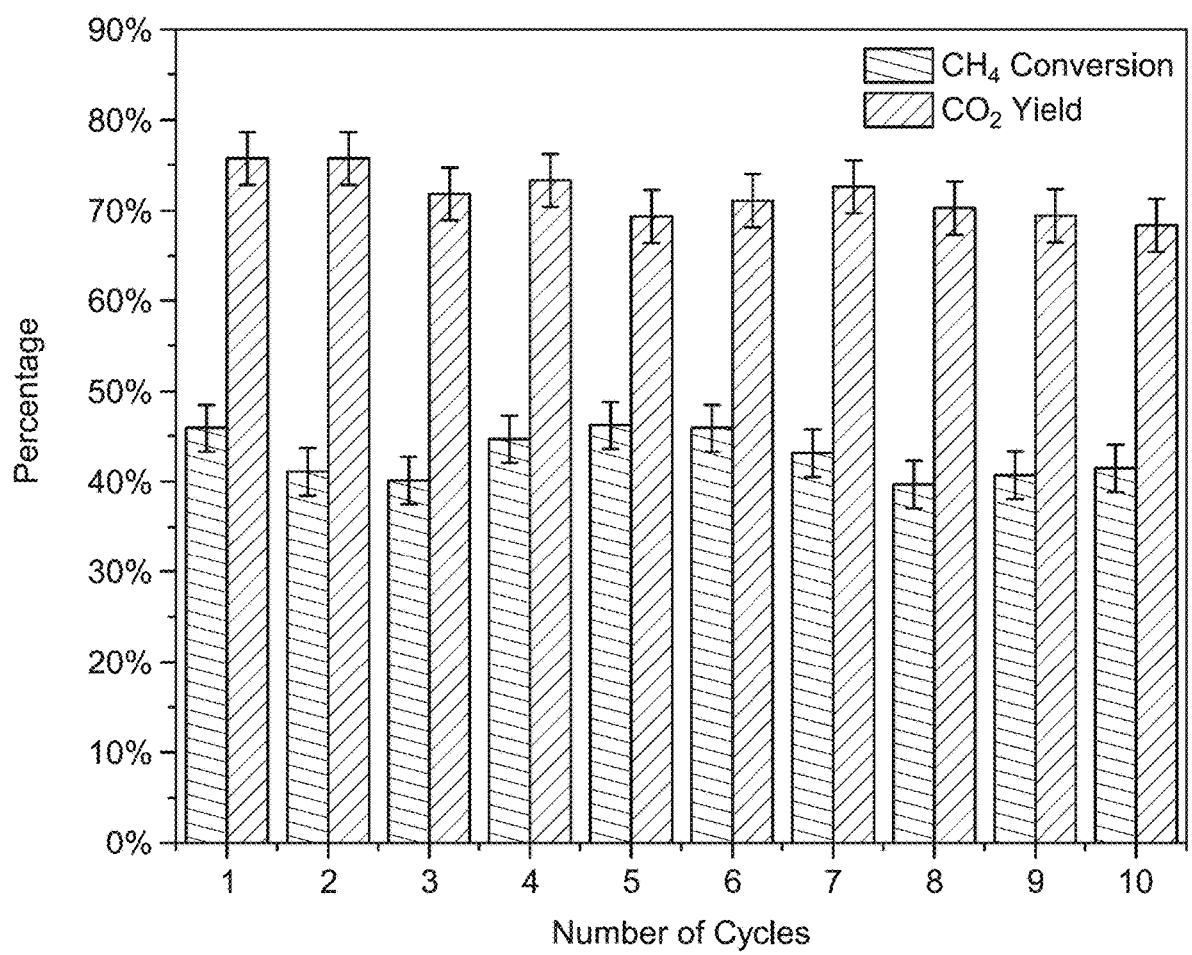
FIG. 18 illustrates methane conversion and $CO_2$ yield over ten redox cycles for F20Ce—Al in a CREC Riser Simulator at 650° C., according to certain embodiments.

Redox stability of F20Ce—Al was evaluated by conducting repeated reduction and oxidation cycles under controlled conditions. The experiment was performed at a temperature of 650° C. with a reaction time of 20 seconds using a fluidized CREC Riser Simulator. The results of the redox cycling test are presented in FIG. 18. As can be seen from FIG. 18, the F20Ce—Al maintained consistent catalytic performance throughout ten consecutive redox cycles. The standard deviation in methane conversion was calculated to be 2.8%, and the standard deviation in carbon dioxide yield was 2.6%, indicating high reproducibility and cycle-to-cycle consistency. Based on the findings of the present disclosure, F20Ce—Al exhibited excellent thermal and redox stability and demonstrated effective performance as an oxygen carrier for hydrogen production through chemical looping.

Aspects of the present disclosure relate to a method for hydrogen production using a chemical looping process, including contacting an oxygen carrier with methane, steam, and air in successive reactor environments. The oxygen carrier was evaluated across multiple stages, including fuel reactor conversion, steam reactor hydrogen generation, and air reactor regeneration, using a fluidized CREC Riser Simulator. Characterization techniques, including XRD, SEM-EDX, BET surface area analysis, TPR, and TPO, confirmed structural, compositional, and redox phase integrity of the oxygen carrier. Methane conversion, $CO_2$ yield, and hydrogen production were demonstrated under varying temperatures, iron loadings, and cycle times. F20Ce—Al displayed a consistent performance profile, achieving methane conversion up to 55% at 650° C. and stable operation across ten redox cycles with low standard deviations in both conversion and product selectivity. Phase transition analysis confirmed $Fe_2O_3$ regeneration in the air reactor, while Fe and FeO were active in fuel and steam reactors for methane conversion and hydrogen production. Oxygen transport capacity increased with Fe loading, and agglomeration effects at higher loadings were identified via HR-TEM and XRD. The disclosed system and material composition offer effective cycle-to-cycle redox performance and favorable gas conversion characteristics for hydrogen production via chemical looping.

Numerous modifications and variations of the present disclosure are possible in light of the above teachings. It is therefore to be understood that within the scope of the appended claims, the disclosure may be practiced otherwise than as specifically described herein.

The invention claimed is:

1. An oxygen carrier, comprising:
   an alumina support;
   cerium oxide in an amount of 0.5 to 2 percent by weight (wt. %); and
   iron oxide in an amount of 5 to 35 wt. %,
   wherein percent by weight is based on a total weight of the oxygen carrier,
   wherein the cerium oxide and the iron oxide are doped on the alumina support,
   wherein the oxygen carrier is in the form of layered particles having a longest dimension of 50 to 500 nm,
   wherein the oxygen carrier has a Brunauer-Emmett-Teller surface area of 5 to 15 $m^2/g$,
   wherein the oxygen carrier is porous with an average pore volume of 0.01 to 0.05 $cm^3/g$ and an average pore diameter of 10 to 20 nm,
   wherein the iron oxide has an average crystallite size of 10 to 30 nm,
   wherein the oxygen carrier comprises a $CeO_2$ phase, an $Al_2O_3$ phase, an $Fe_2O_3$ phase, and an $FeAl_2O_4$ phase.

2. The oxygen carrier of claim 1, wherein the oxygen carrier consists of the $CeO_2$ phase, the $Al_2O_3$ phase, the $Fe_2O_3$ phase, and the $FeAl_2O_4$ phase.

3. The oxygen carrier of claim 1, wherein the oxygen carrier has a degree of crystallinity of 60 to 70% based on a ratio of crystal peak area to total area of an X-ray diffraction graph.

4. The oxygen carrier of claim 1, wherein the oxygen carrier comprises iron oxide in an amount of 8 to 12 wt. %.

5. The oxygen carrier of claim 1, wherein the oxygen carrier comprises iron oxide in an amount of 18 to 22 wt. %.

6. The oxygen carrier of claim 1, wherein the oxygen carrier comprises iron oxide in an amount of 28 to 32 wt. %.

7. The oxygen carrier of claim 1, wherein the iron oxide in the oxygen carrier is reduced from hematite ($Fe_2O_3$) to magnetite ($Fe_3O_4$) at a temperature of 370 to 410° C.

8. The oxygen carrier of claim 1, wherein the iron oxide in the oxygen carrier is reduced from magnetite ($Fe_3O_4$) to iron(I) oxide (FeO) at a temperature of 530 to 570° C.

9. The oxygen carrier of claim 1, wherein the iron oxide in the oxygen carrier is reduced from iron(II) oxide (FeO) to iron ($Fe^0$) at a temperature of 610 to 670° C.

10. The oxygen carrier of claim 1, wherein the oxygen carrier has an oxygen transport capacity release efficiency of 55 to 75% based on temperature-programmed reduction.

11. The oxygen carrier of claim 1, wherein the oxygen carrier has an oxygen transport capacity capture efficiency of 60 to 90% based on temperature-programmed oxidation.

12. A method of methane conversion, comprising:
   contacting the oxygen carrier of claim 1 with methane for 1 to 30 seconds at a temperature of 600 to 700° C. in a reactor to reduce the oxygen carrier and produce at least one gas selected from the group consisting of carbon dioxide, carbon monoxide, water, and hydrogen in the reactor.

13. The method of claim 12, further comprising:
   contacting the reduced oxygen carrier with water and/or air to regenerate the oxygen carrier; and
   contacting the oxygen carrier with methane to reduce the oxygen carrier and contacting the reduced oxygen carrier with water and/or air to regenerate the oxygen carrier 8 to 12 times,
   wherein a methane conversion is at least 35% based on an initial amount of methane during the 8 to 12 times contacting.

14. The method of claim 12, wherein the reactor is at a pressure of 0.5 to 2 bar.

15. The method of claim 12, wherein 10 to 15 mL of a feed per gram of oxygen carrier is injected into the reactor.

16. The method of claim 12, wherein the reactor is selected from the group consisting of a fuel reactor, an air reactor, and a steam reactor.

17. The method of claim 12, wherein carbon dioxide is produced in an amount of at least 30 percent by weight (wt. %) based on an initial amount of methane.

* * * * *